US010824594B2

(12) United States Patent
Guest

(10) Patent No.: US 10,824,594 B2
(45) Date of Patent: Nov. 3, 2020

(54) ASSOCIATING A CAPTURED SCREENSHOT WITH APPLICATION-SPECIFIC METADATA THAT DEFINES A SESSION STATE OF AN APPLICATION CONTRIBUTING IMAGE DATA TO THE CAPTURED SCREENSHOT

(71) Applicant: QUALCOMM Incorporated, San Diego, CA (US)

(72) Inventor: Daniel Guest, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 481 days.

(21) Appl. No.: 15/607,414

(22) Filed: May 26, 2017

(65) Prior Publication Data
US 2018/0129657 A1    May 10, 2018

Related U.S. Application Data
(60) Provisional application No. 62/418,501, filed on Nov. 7, 2016.

(51) Int. Cl.
| G06F 7/00 | (2006.01) |
| G06F 17/00 | (2019.01) |
| G06F 16/16 | (2019.01) |
| G06F 9/44 | (2018.01) |
| G06F 3/0484 | (2013.01) |

(52) U.S. Cl.
CPC ........ *G06F 16/164* (2019.01); *G06F 3/04842* (2013.01); *G06F 3/04845* (2013.01); *G06F 9/44* (2013.01)

(58) Field of Classification Search
None
See application file for complete search history.

(56) References Cited

U.S. PATENT DOCUMENTS

| 8,478,767 B2 | 7/2013 | Kern et al. |
| 8,938,683 B2 | 1/2015 | Bentrup |
| 9,021,367 B2 | 4/2015 | Chan et al. |

(Continued)

FOREIGN PATENT DOCUMENTS

| EP | 2487871 A1 | 8/2012 |
| WO | 2007122145 A1 | 11/2007 |
| WO | 2014123169 A1 | 8/2014 |

OTHER PUBLICATIONS

International Search Report and Written Opinion—PCT/US2017/047728—ISA/EPO—dated Nov. 16, 2017.

*Primary Examiner* — Tuan A Pham
(74) *Attorney, Agent, or Firm* — Muncy, Geissler, Olds & Lowe, P.C.

(57) ABSTRACT

In an embodiment, a UE detects a request to capture a screenshot of image data being output on a display screen, obtains application-specific metadata that is configured to facilitate recreation of characteristics of a session state of an application that is contributing at least a portion of the image data being output on the display screen when the request is detected. The UE selectively captures the screenshot of the image data being output on the display screen in response to the request, and stores the obtained application-specific metadata. The same or different UE may obtain some or all of the application-specific metadata (and optionally the screenshot, if captured), and recreates some or all of the characteristics using the same or different application.

25 Claims, 19 Drawing Sheets

(56) References Cited

U.S. PATENT DOCUMENTS

| | | |
|---|---|---|
| 9,165,207 B2 | 10/2015 | Ruppaner |
| 9,497,312 B1* | 11/2016 | Johansson ......... H04M 1/72577 |
| 2006/0075205 A1 | 4/2006 | Martin et al. |
| 2007/0255767 A1 | 11/2007 | Kikuchi |
| 2008/0307347 A1 | 12/2008 | Cisler et al. |
| 2010/0161207 A1* | 6/2010 | Do ....................... H04W 4/024 |
| | | 701/532 |
| 2011/0320626 A1 | 12/2011 | Wong et al. |
| 2012/0096069 A1 | 4/2012 | Chan |
| 2014/0301645 A1* | 10/2014 | Mattila .............. G06K 9/00671 |
| | | 382/182 |
| 2015/0324067 A1* | 11/2015 | Cabral ................. G06F 3/0338 |
| | | 715/811 |
| 2015/0331711 A1* | 11/2015 | Huang .................. G06F 3/0481 |
| | | 719/320 |
| 2016/0048398 A1* | 2/2016 | Taylor ....................... G06F 8/65 |
| | | 717/168 |
| 2016/0078292 A1 | 3/2016 | Deryagin |
| 2016/0184712 A1* | 6/2016 | Colenbrander ......... A63F 13/90 |
| | | 463/29 |

* cited by examiner

ASSOCIATING A CAPTURED SCREENSHOT WITH APPLICATION-SPECIFIC METADATA THAT DEFINES A SESSION STATE OF AN APPLICATION CONTRIBUTING IMAGE DATA TO THE CAPTURED SCREENSHOT

CROSS-REFERENCE TO RELATED APPLICATIONS

The present Application for Patent claims the benefit of U.S. Provisional Application No. 62/418,501 entitled "ASSOCIATING A CAPTURED SCREENSHOT WITH APPLICATION-SPECIFIC METADATA THAT DEFINES A STATE OF AN APPLICATION CONTRIBUTING IMAGE DATA TO THE CAPTURED SCREENSHOT", filed Nov. 7, 2016, which is by the same inventors as the subject application, assigned to the assignee hereof and hereby expressly incorporated by reference herein in its entirety.

BACKGROUND

1. Field of the Disclosure

Embodiments relate to associating a captured screenshot with application-specific metadata that defines a session state of an application contributing image data to the captured screenshot.

2. Description of the Related Art

Many user equipments (UEs) with display functionality support a screenshot capture function. For example, computers (e.g., laptop computers, desktop computers) running a Windows Operating System (OS) copy a screenshot image (e.g., of an entire display screen area or of a particular window area depending on configuration settings) to clipboard memory in response to a user pressing the ALT and PrintScreen keys simultaneously. In another example, UEs running a mobile operating system such as iOS (e.g., iPhone, iPad, iPod Touch, etc.) copy a screenshot image to photo gallery in response to a user pressing the Home button and Power button simultaneously.

Users may desire to capture screenshots for a variety of reasons, including but not limited to archiving a desired item from a shopping website, a purchase confirmation, a particular section of a text chat conversation, a particular frame of a video program (e.g., TV, YouTube, etc.), a particular section of a map or navigation route, particular text from an e-book or informational website (e.g., Wikipedia, etc.), and so on.

SUMMARY

An embodiment is directed to a method of operating a user equipment (UE), including detecting a request to capture a screenshot of image data being output on a display screen, obtaining application-specific metadata that is configured to facilitate recreation of one or more characteristics of a session state of an application that is contributing at least a portion of the image data being output on the display screen when the request is detected, selectively capturing the screenshot of the image data being output on the display screen in response to the request, and storing the obtained application-specific metadata.

Another embodiment is directed to a method of operating a UE, including obtaining application-specific metadata that defines a session state of a first application that contributed image data within a display frame when a screenshot capture request was issued, detecting a request to load the session state of the first application defined by the application-specific metadata and processing, by a second application in response to the request, the application-specific metadata to recreate one or more characteristics of the session state defined by the application-specific metadata.

Another embodiment is directed to a UE, including at least one processor configured to detect a request to capture a screenshot of image data being output on a display screen, obtain application-specific metadata that is configured to facilitate recreation of one or more characteristics of a session state of an application that is contributing at least a portion of the image data being output on the display screen when the request is detected, selectively capture the screenshot of the image data being output on the display screen in response to the request, and store the obtained application-specific metadata.

Another embodiment is directed to a UE, including at least one processor configured to obtain application-specific metadata that defines a session state of a first application that contributed image data within a display frame when a screenshot capture request was issued, detect a request to load the session state of the first application defined by the application-specific metadata, and process, by a second application in response to the request, the application-specific metadata to recreate one or more characteristics of the session state defined by the application-specific metadata.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
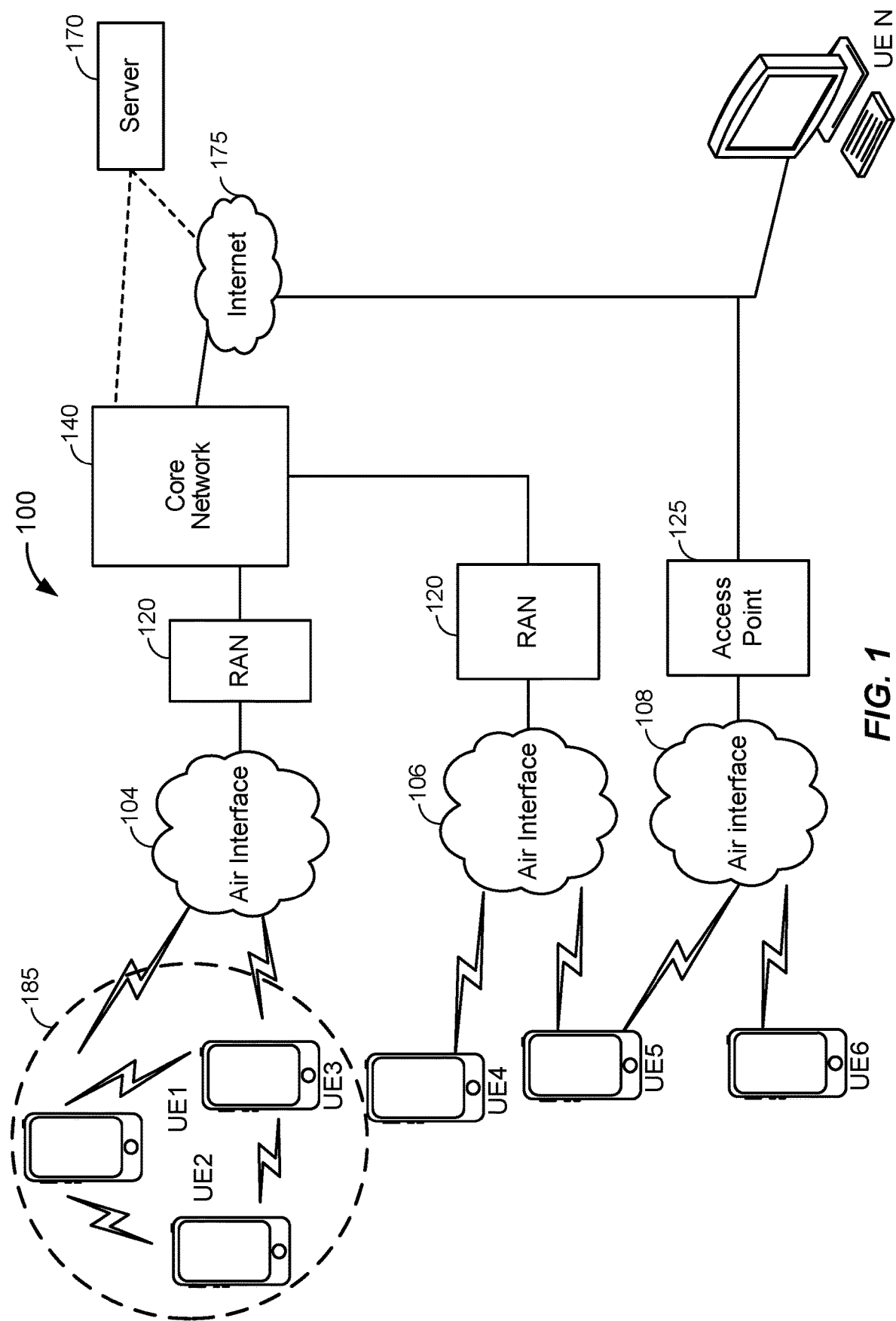
FIG. 1 illustrates a high-level system architecture of a wireless communications system in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, a social networking service, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2:
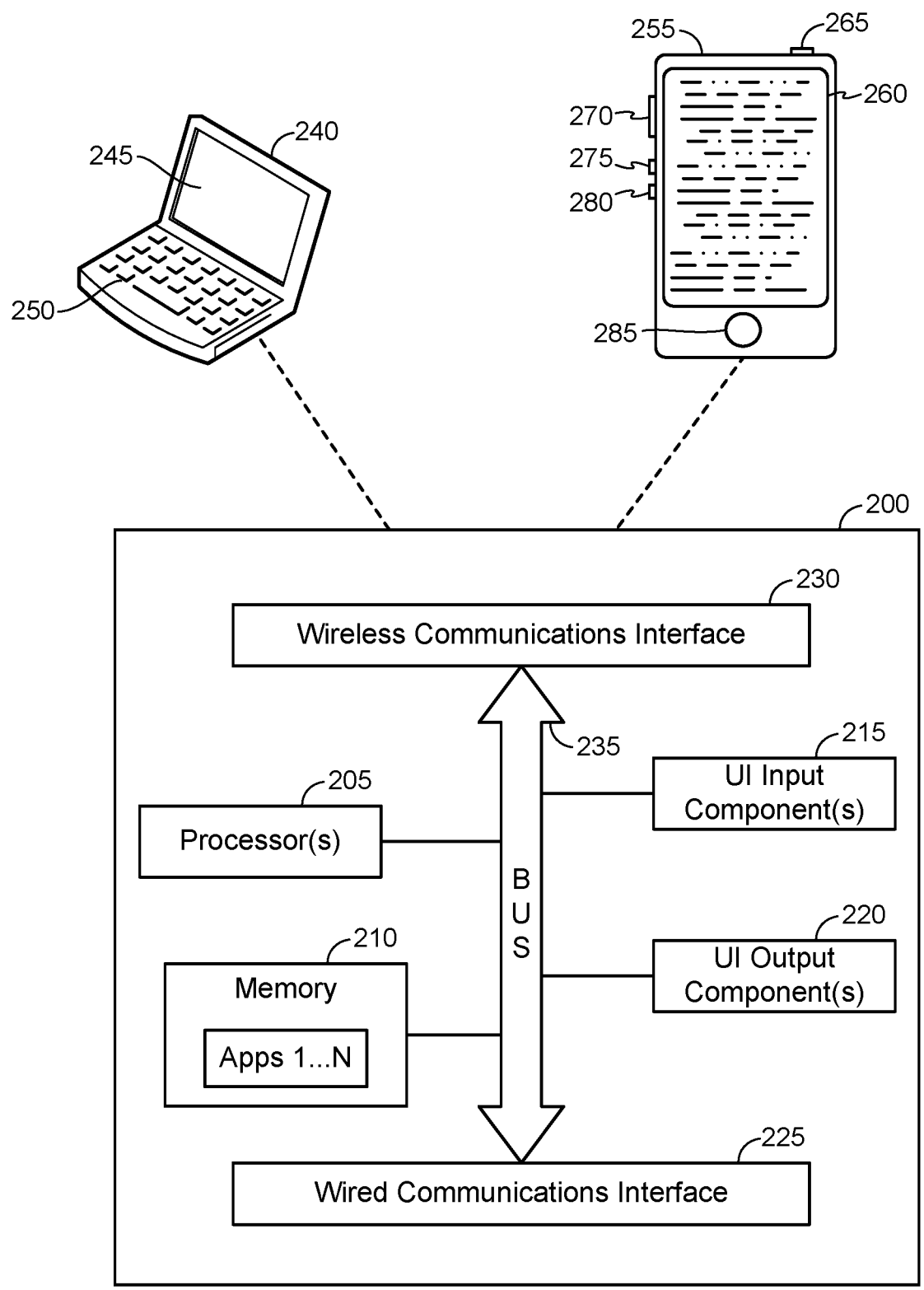
FIG. 2 illustrates a user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The memory 210 includes a plurality of applications 1 . . . N that are executable by the one or more processors 205 via an associated operating system. The UE 200 also includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a USB connection, a mini USB, Firewire or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, LTE-D, Miracast, etc.). The wireless communications interface 225 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as laptop 240 and touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, satellite position system (SPS) antennas such as global positioning system (GPS) antennas, etc.).

The touchscreen device 255 is configured with a touchscreen display 260, peripheral buttons 265, 270, 275 and 280 (e.g., a power button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, SPS antennas (e.g., GPS antennas), and so on.

Figure 3:
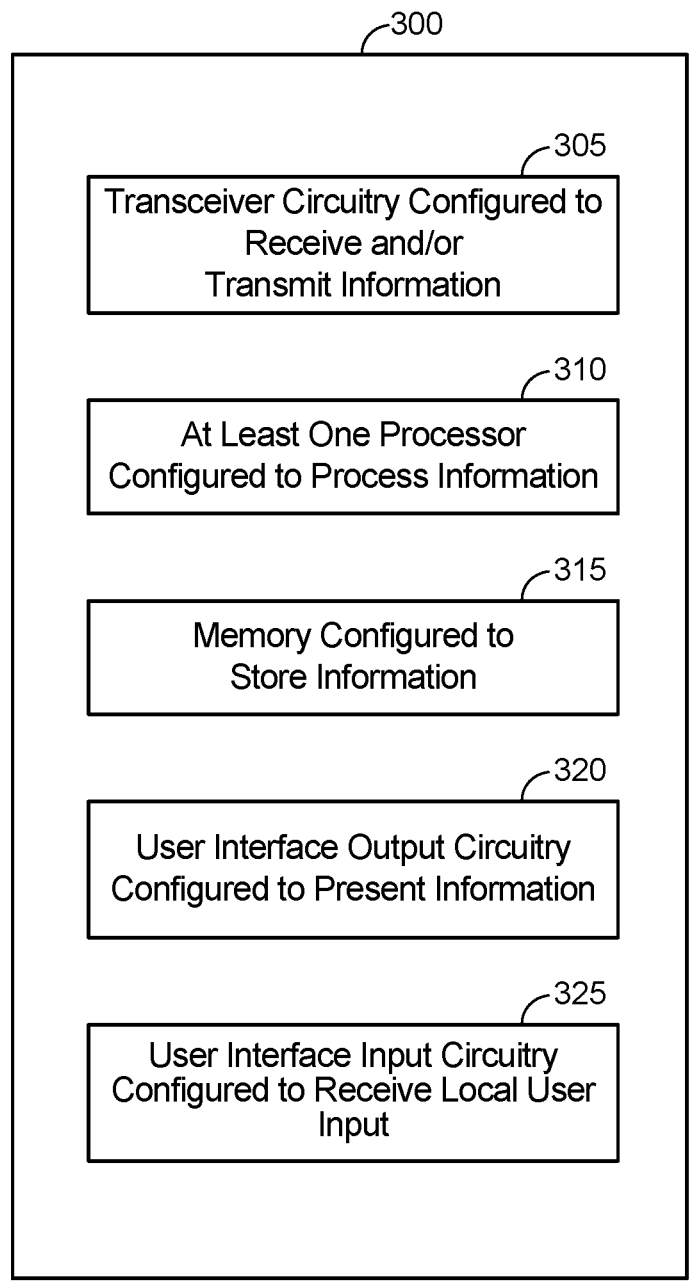
FIG. 3 illustrates a communications device that includes structural components in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UE 200.

Referring to FIG. 3, the communications device 300 includes transceiver circuitry configured to receive and/or transmit information 305. In an example, if the communications device 300 corresponds to a wireless communications device (e.g., UE 200), the transceiver circuitry configured to receive and/or transmit information 305 can include a wireless communications interface (e.g., Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB, Firewire or lightning connection, an Ethernet connection through which the Internet 175 can be accessed, etc.). In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200 as shown in FIG. 2, the user interface output circuitry configured to present information 320 can include a display such as display 245 or touchscreen display 260. The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For example, functions such as displaying, outputting, prompting, conveying, etc., may be performed by the user interface output circuitry configured to present information 320 in certain contexts as being specific types of presenting functions. Other functions that correspond to other types of presenting functions may also be performed by the user interface output circuitry configured to present information 320.

Referring to FIG. 3, the communications device 300 further includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200 as shown in FIG. 2, the user interface input circuitry configured to receive local input 325 may correspond to UI area 250 or touchscreen display 260, etc. The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user input function. For example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 perform their respective functionality can overlap in part. For example, any software used to facilitate the functionality of the configured structural components of 305 through 325 can be stored in the non-transitory memory associated with the memory configured to store information 315, such that the configured structural components of 305 through 325 each perform their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Many UEs with display functionality support a screenshot capture function. For example, computers (e.g., laptop computers, desktop computers) running a Windows Operating System (OS) copy a screenshot image (e.g., of an entire display screen area or of a particular window area depending on configuration settings) to clipboard memory in response to a user pressing the ALT and PrintScreen keys simultaneously. In another example, UEs running a mobile operating system such as iOS (e.g., iPhone, iPad, iPod Touch, etc.) copy a screenshot image to a photo gallery in response to a user pressing the Home button and Power button simultaneously.

Users may desire to capture screenshots for a variety of reasons, including but not limited to archiving a desired item from a shopping website, a purchase confirmation, a particular section of a text chat conversation, a particular frame of a video program (e.g., TV, YouTube, etc.), a particular section of a map or navigation route, particular text from an e-book or informational website (e.g., Wikipedia, etc.), and so on.

Figure 4:
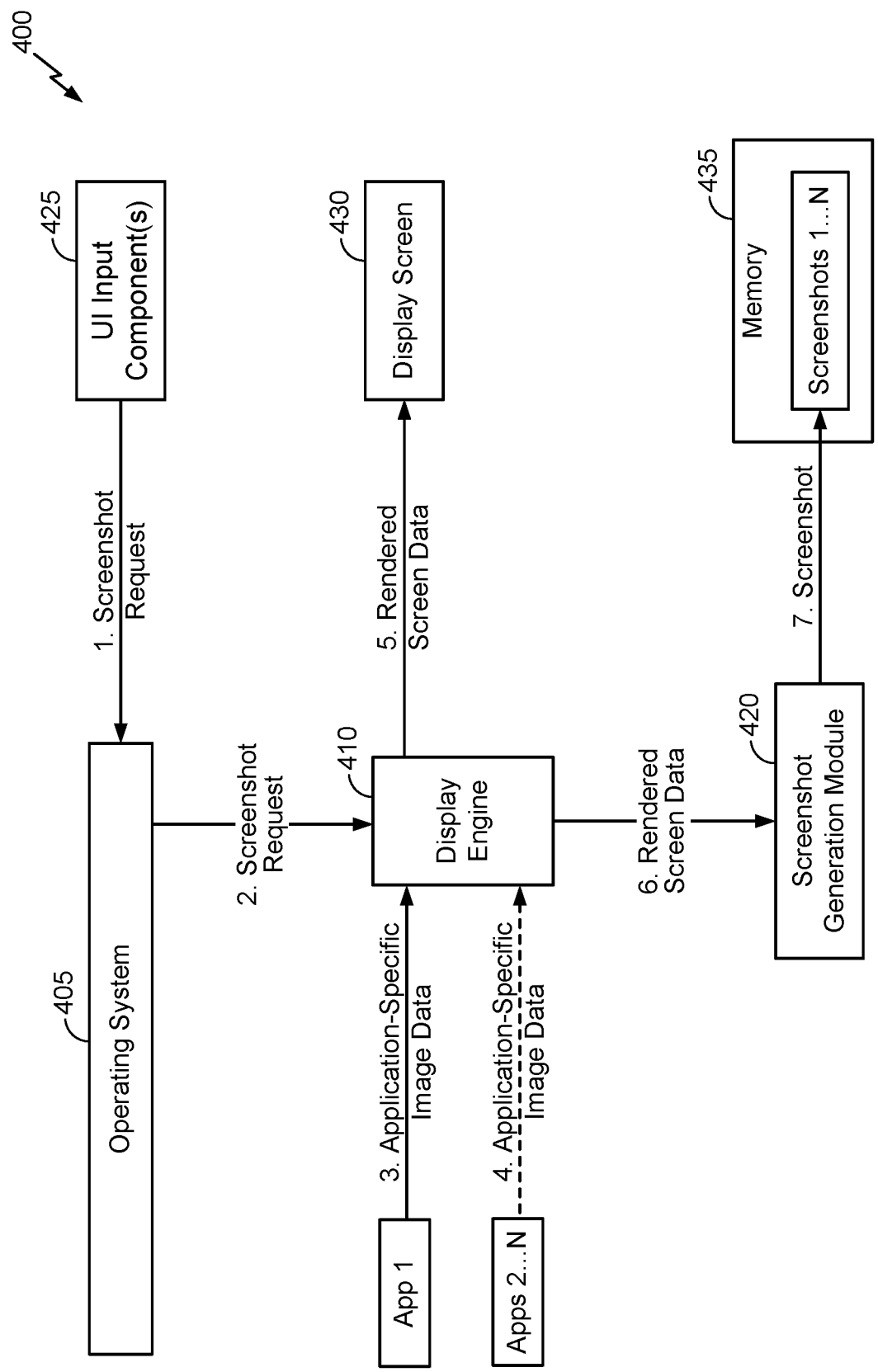
FIG. 4 illustrates an example of component interaction in association with screenshot capture in a UE operating environment.

FIG. 4 illustrates an example of component interaction in association with screenshot capture in a UE operating environment 400. The UE operating environment 400 includes an OS 405, a display engine 410 (e.g., one or more graphics device drivers, a graphics card, a dedicated graphics kernel, etc.), UE-executable applications 1 . . . N (e.g., stored in associated memory at the UE, where N is greater than or equal to 2), and a screenshot generation module 420. The UE operating environment 400 further includes UI input component(s) 425 (e.g., corresponding to 215 of FIG. 2, 325 of FIG. 3, etc.), a display screen 430 (e.g., corresponding to 220 of FIG. 2, 320 of FIG. 3, etc.) and a memory 435 (e.g., corresponding to 210 of FIG. 2, 315 of FIG. 3, etc.).

Referring to FIG. 4, a functional flow is depicted via operations enumerated as 1 through 7. The specific order in which operations 1 through 7 may vary by implementation (e.g., operations 3 and 4 can occur in any order, etc.). At operation 1, a screenshot request is detected by the OS 405 via the UI input component(s) 425. For example, operation 1 may correspond to detection of a user pushing ALT and PrintScreen simultaneously via keys of a keyboard in a Windows OS environment, detection of a user pushing Home and power button simultaneously in an iOS environment, and so on. At operation 2, the OS 405 sends a screenshot request to the display engine 410. At operation 3, application 1 provides, to the display engine 410, application-specific image data to be rendered within a display frame for output by the display screen 430. At operation 4, applications 2 . . . N may also optionally provide application-specific image data to be rendered within the display frame for output by the display screen 430. Operation 4 is optional because it is possible that the UE is operating in full-screen mode with respect to application 1, in which case only image data for application 1 is made part of the display frame. At operation 5, the display engine 410 sends rendered screen data to the display screen 430 based on the application-specific image data from application 1 (and optionally, applications 2 . . . N as well).

In response to the screenshot request from the OS 405, at operation 6, the display engine 410 also sends the rendered screen data to the screenshot generation module 420. The screenshot generation module 420 generates the screenshot based on the rendered screen data and also based on certain file-specific (or application-generic) metadata (e.g., time of screen capture, filename, file size, etc.). At operation 7, the screenshot generation module 420 sends the generated (or captured) screenshot to the memory 435, where the screenshot is stored among a set of stored screenshots 1 . . . N.

While a screenshot is very effective for storing the raw image data depicted on a display screen at a particular point in time, the screenshot may not be particularly effective in guiding a user (e.g., the user taking the initial screenshot or a different user with which the screenshot is shared) back to a state of an application session (or session state) depicted in the screenshot. For example, conventional metadata stored in association with the screenshot would typically include file-specific metadata only (e.g., time of screen capture, filename, file size, etc.), which is not particularly helpful to a user that wants to plot a navigation route to an address depicted on a map on the screenshot, or to a user that wants to check a shipping status on a purchased item based on a screenshot of a purchase confirmation for that purchased item, and so on.

Embodiments of the disclosure are thereby directed to associating a captured screenshot with application-specific metadata that defines a session state of an application contributing image data to the captured screenshot. As will be described below, the application-specific metadata may permit a UE to recreate one or more characteristics of the session state defined by the application-specific metadata, as opposed to merely displaying the raw image content of the captured screenshot.

Figure 5:
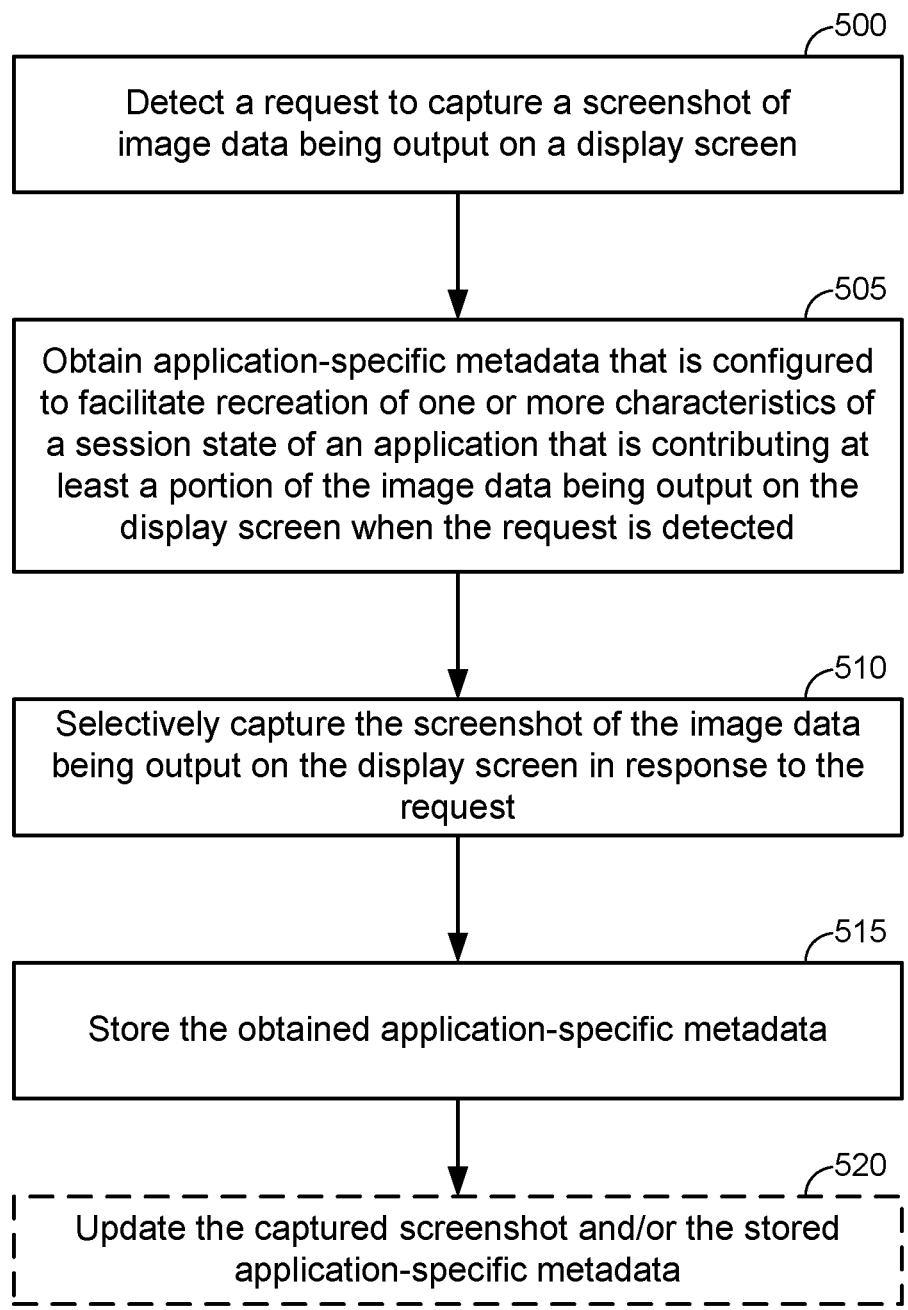
FIG. 5 illustrates a screenshot capture procedure in accordance with an embodiment of the disclosure.

FIG. 5 illustrates a screenshot capture procedure in accordance with an embodiment of the disclosure. The screenshot capture procedure of FIG. 5 is performed at a UE and captures image data being output on some or all of a display screen. The display screen may correspond to the display screen of the UE itself, in which case the screenshot capture is analogous to the example described above with respect to FIG. 4 (e.g., a self-capture of the screenshot). However, the display screen may alternatively to the display screen of another device altogether, in which case the captured screenshot is a snapshot of the other device's display screen (e.g., a user of the UE places the UE into camera mode and takes a snapshot of another display screen). The display screen described with respect to FIG. 5 may correspond to one of the UI output components 220 of UE 200 in FIG. 2, or the user interface output circuitry configured to present information 320 of FIG. 3.

Referring to FIG. 5, at block 500, the UE detects a request to capture a screenshot of image data being output on the display screen. For example, block 500 may correspond to detection of a user pushing ALT and PrintScreen simultaneously via keys of a keyboard in a Windows OS environment, detection of a user pushing Home and power button simultaneously in an iOS environment, and so on. In another example, as noted above, block 500 may correspond to detection of the user placing the UE into camera mode (or viewfinder mode) and taking a snapshot of an external display screen. At block 505, the UE obtains application-specific metadata that defines (or is configured to facilitate recreation of one or more characteristics of) a session state of an application that is contributing at least a portion of the image data being output on the display screen when the request is detected.

As used herein, the application-specific metadata may define the session state in part based upon information that initializes a session with a particular application (e.g., a URL that is used by a web browser to initiate a web session with a web site reachable at the URL, an application ID that can be used to identify an application to start an application session, and so on). However, the application-specific metadata further characterizes an instantaneous (or current) session state as reflected in the image data undergoing screen capture, and not merely the initialization session state. For example, the session state may include a URL coupled with secondary information that characterizes the URL session in a manner that is not derivable from the URL itself, such as a level of zoom, a particular object of focus that the user has scrolled to on an associated web page, a time point at which a video frame streamed from the URL is depicted in the image data, and so on. In an example, the URLs that may be added to the application-specific metadata include not only top-level webpage URLs, but may also include image URLs and image alt text (e.g., text that is displayed in place of an image where the image cannot be readily obtained). In an example, the image URLs and/or img alt text may be used as fallback mechanisms if the top-level webpage URL is no longer available and/or is slow to load.

As will be described below in more detail, if one or more additional applications are also contributing image data that is being output on the display screen, the UE may obtain application-specific metadata that defines (or is configured to facilitate recreation of one or more characteristics of) one or more session states of the one or more additional applications as well.

Referring to block 505 of FIG. 5, the application-specific metadata may be obtained in a variety of ways, including any combination of the following:

- Some portion of the application-specific metadata may be retrieved directly from the application (e.g., the application itself provides the application-specific metadata that may be used to recreate some or all of the application session state characteristics depicted in the screenshot);
- Some portion of the application-specific metadata may be contributed by the operating system of the UE;
- Some portion of the application-specific metadata may be derived or extracted from the image data being output on the display screen via computer vision capabilities (e.g., optical character recognition (OCR) is applied to text contained in the image data being output on the display screen and added to the application-specific metadata);
- Some portion of the application-specific metadata may be received from another device that is external to the UE. In the snapshot example noted above, a first UE may be connected to a second UE. The first UE takes a snapshot of a display screen of the second UE. The first UE sends a query (e.g., over a D2D connection) for application-specific metadata characterizing session states of one or more applications contributing image data to the display screen output at the second UE at the time the snapshot was captured. The second UE provides the requested application-specific metadata (e.g., over the D2D connection).
- Some portion of the application-specific metadata may be received from any of the above-noted sources and then post-processed into a different form. For example, a web browser may provide a current URL being displayed in a screenshot, and the URL may be analyzed or post-processed to obtain secondary information for recreating a particular session state of the current URL (e.g., a Google Maps URL is captured in the screenshot, and the post-processing extracts an address or geographic area depicted in the screenshot and identified Google Maps as opposed to the specific URL in the application-specific metadata). The post-processing can be performed by any suitable entity, such as a dedicated application or software module, the OS or the application itself.

Referring to FIG. 5, at block 510, the UE selectively captures the screenshot of the image data being output on the display screen in response to the request. In an example, the screenshot capture at block 510 may always be performed. However, in other embodiments, the screenshot capture at block 510 may be based on various criteria, such as a storage space factor or an application-specific metadata reliability factor. For example, if very reliable application-specific metadata is available for recreation of the image data being output on the display screen (e.g., a deep-link URL to an image file that is being displayed full-screen in a display frame), then scraping a display frame to capture the specific pixels of the screenshot can be omitted. In another example, if available storage space on the UE is very limited, the screenshot capture at block 510 may be omitted (e.g., to conserve storage space). Accordingly, while reference is made with respect to "captured" screenshots, implying that the screenshot capture of block 510 actually takes place, these references are made as examples as other embodiments may obtain the application-specific metadata at block 505 without actually capturing (and storing) the screenshot.

Still referring to block 510 of FIG. 5, it will be appreciated that block 510 does not necessarily occur after block 505, as the respective operations depicted in blocks 505-510 can occur in any order or even concurrently. Further, the screenshot capture at block 510 can correspond to a full-screen capture (e.g., a screenshot of an entire display frame that is being output by the display screen is captured) or a partial-screen capture (e.g., a particular window in the display frame or a particular section of the display screen, which may be user-defined, is captured). In an example, in the case of a partial-screen capture, the application-specific metadata that is obtained at block 505 may be limited to the application(s) contributing image data inside of the relevant screen area being captured at block 510, and may omit application-specific metadata for application(s) that only contribute image data outside of the relevant screen area being captured at block 510. Moreover, it is possible that the screen capture of block 510 relates to a display frame that is output by multiple display screens, in which case the screenshot may encompass the image data across the multiple display screens or for one designated display screen only. As noted above, the capture operation of block 510 may correspond to a capture of the image data being output by a display screen of the UE itself, or alternatively to a snapshot taken by a camera of the UE of a display screen of an external device.

Referring to FIG. 5, once captured, the UE stores the obtained application-specific metadata at block 515. Block 515 can be accomplished in a variety of ways. In an example, the captured screenshot may also be stored in association with the obtained application-specific metadata at block 515, although this is not strictly necessary (e.g., it is possible that the captured screenshot can be discarded after the application-specific metadata is obtained, to save memory for example). If both the captured screenshot and the application-specific metadata are stored at block 515, in an example, the application-specific metadata can be appended to a header or overhead portion of a screenshot file (e.g., similar to how other file-specific metadata is stored, such as the filename, time of screen capture, etc. is stored) that is separate from a media portion where the captured image data is stored. In another example where both the captured screenshot and the application-specific metadata are stored at block 515, the application-specific metadata may be watermarked into the image data of the media portion itself. In another example where both the captured screenshot and the application-specific metadata are stored at block 515, the application-specific metadata can be stored separate from the screenshot file, with some type of pointer or other virtual link forming the association noted above at block 515.

Referring to FIG. 5, at block 520, the UE optionally updates the captured screenshot and/or the stored application-specific metadata. Various examples of how the captured screenshot and/or the stored application-specific metadata may be updated will now be provided.

In a first example of block 520 of FIG. 5, a user may edit or modify the captured screenshot by cropping the captured screenshot. In one embodiment, cropping of the captured screenshot may prompt the UE to determine if any application-specific metadata relates only to the cropped portion of the captured screenshot. If so, the application-specific metadata related to the cropped portion can be removed (e.g., a user crops the captured screenshot so that a particular image is no longer shown, and an image URL and/or image alt text for that particular image can be removed from the application-specific metadata. In another embodiment, the user may crop the captured screenshot so that only a single image remains in-view within the cropped captured screenshot. In this case, the image URL for the remaining image may be prioritized over other application-specific metadata related to the cropped portion.

In a second example of block 520 of FIG. 5, a user may edit or modify the captured screenshot to add supplemental information, such as tagging one or more items (e.g., people, products, locations, etc.) in the captured screenshot. The application-specific metadata may be updated at block 520 to include reference to the tagged item(s) (e.g., the captured screenshot shows movie tickets to a particular movie, the user tags that particular movie, and the application-specific metadata is updated to include a URL to a website where the movie can be purchased).

In a third example of block 520 of FIG. 5, assume that block 510 captures the screenshot and stores the captured screenshot in association with the application-specific metadata at block 515, after which a user deletes the captured screenshot. In an example, this may cause the associated application-specific metadata to be deleted as well. In an alternative example, the application-specific metadata may be preserved even if the captured screenshot is deleted.

In a fourth example of block 520 of FIG. 5, the image data may include one or more informational objects (e.g., a map, a bus schedule, etc.). In this case, the informational object(s) may be identified in the application-specific metadata. The UE may check the informational object(s) (e.g., on a periodic basis, such as monthly while a WiFi connection is available, or an event-triggered basis, such as whenever the UE is asked to recreate the session state of the application) to determine if any updates are available (e.g., updated maps, a modified bus schedule, etc.). In an example, OCR matching or a computer vision-based similarity matching algorithm can be used to identify the information object(s). In a further example, machine learning image categorization can be used to detect information objects for which updating may be performed (e.g., perform update checks for bus schedules, but not for memes). In a further example, an informational object may include product pricing for an identified product visually depicted or otherwise referenced in the screenshot. In this case, the update check may include fetching real-time pricing for the product (e.g., from a particular set of retailers, such as Amazon.com, etc.). For example, a user may snap a screenshot that shows a pair of running shoes, and the update check may monitor real-time pricing of the pair of running shoes and notify the user if the price changes.

Figure 6:
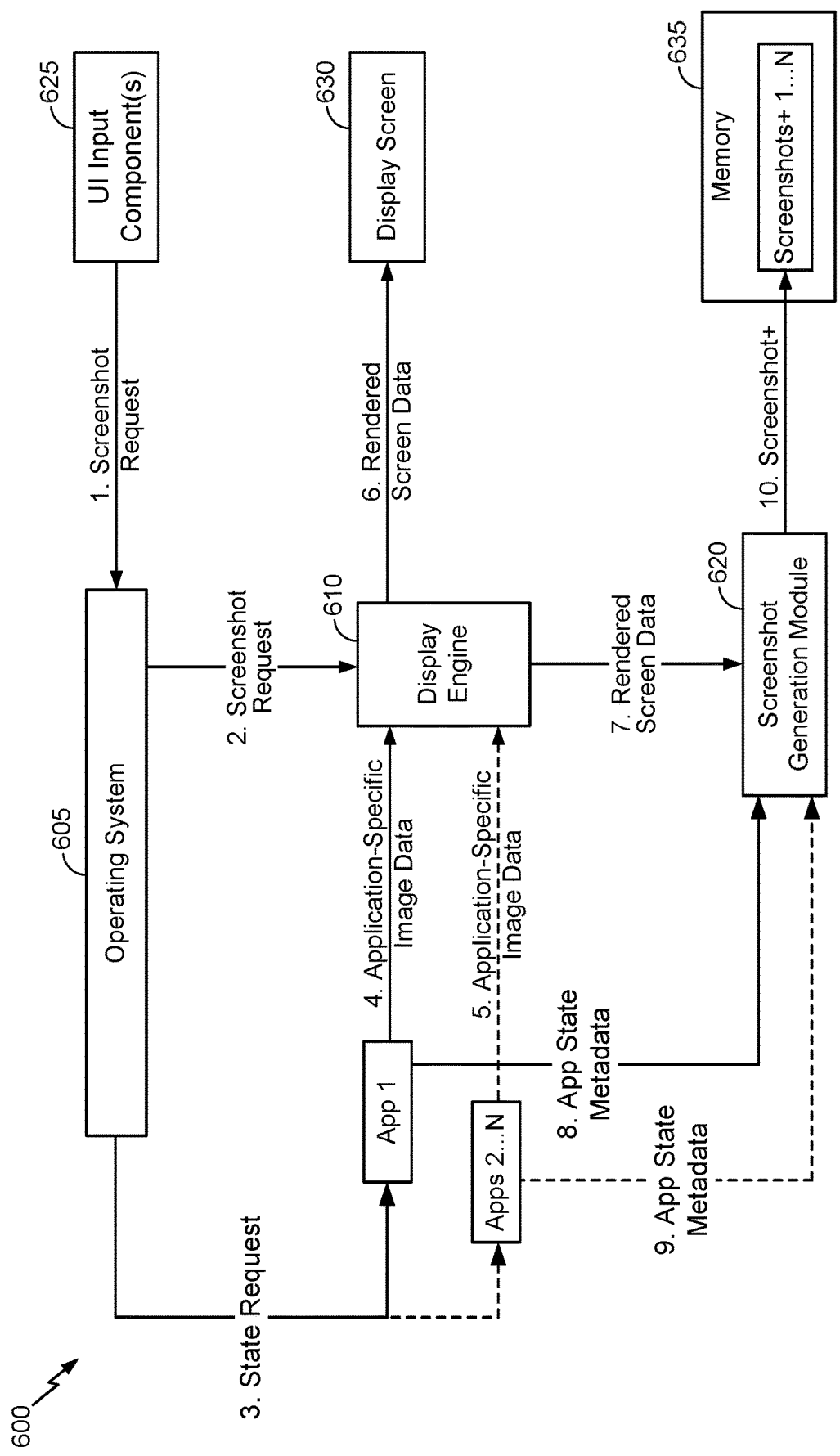
FIG. 6 illustrates an example of component interaction in association with screenshot capture in a UE operating environment in accordance with an embodiment of the disclosure.

FIG. 6 illustrates an example of component interaction in association with screenshot capture in a UE operating environment 600 in accordance with an embodiment of the disclosure. The example depicted in FIG. 6 is specific to an implementation where the application-specific metadata is obtained from the image-contributing application(s) at block 505, and to where the UE is capturing a screenshot of its own display screen at block 510. However, this is intended as a non-limiting example, as the application-specific metadata can be obtained from one or more other alternative sources, and the UE could alternatively be capturing a screenshot of an external display screen, as noted above.

In terms of components, the UE operating environment 600 is similar to the UE operating environment 400 of FIG. 4. Accordingly, the UE operating environment 600 includes an OS 605, a display engine 610 (e.g., one or more graphics device drivers, a graphics card, a dedicated graphics kernel, etc.), UE-executable applications 1 . . . N (e.g., stored in associated memory at the UE, where N is greater than or equal to 2), and a screenshot generation module 620. The UE operating environment 600 further includes UI input component(s) 625 (e.g., corresponding to 215 of FIG. 2, 325 of FIG. 3, etc.), a display screen 630 (e.g., corresponding to 220 of FIG. 2, 320 of FIG. 3, etc.) and a memory 635 (e.g., corresponding to 210 of FIG. 2, 315 of FIG. 3, etc.).

Referring to FIG. 6, an example implementation of the process of FIG. 5 is depicted via operations enumerated as 1 through 10. The specific order in which operations 1 through 10 may vary by implementation (e.g., operations 4 and 5 can occur in any order, etc.). At operation 1, a screenshot request is detected by the OS 605 via the UI input component(s) 425. For example, operation 1 may correspond to detection of a user pushing ALT and PrintScreen simultaneously via keys of a keyboard in a Windows OS environment, detection of a user pushing Home and power button simultaneously in an iOS environment, and so on. At operation 2, the OS 605 sends a screenshot request to the display engine 610. Operations 1-2 in FIG. 6 are similar to operations 1-2 as described above with respect to FIG. 4.

Referring to FIG. 6, at operation 3, the OS 605 sends a session state request to application 1 and optionally to applications 2 . . . N. In an example, if applications 2 . . . N are not currently executing or are not currently contributing image data within a target area for the screenshot, the OS 605 need not send the session state request to applications 2 . . . N.

Referring to FIG. 6, at operation 4, application 1 provides, to the display engine 610, application-specific image data to be rendered within a display frame for output by the display screen 630. At operation 5, applications 2 . . . N may also optionally provide application-specific image data to be rendered within the display frame for output by the display screen 630. Operation 5 is optional because it is possible that the UE is operating in full-screen mode with respect to application 1, in which case only image data for application 1 is made part of the display frame. At operation 6, the display engine 610 sends rendered screen data to the display screen 630 based on the application-specific image data from application 1 (and optionally, applications 2 . . . N as well). In response to the screenshot request from the OS 405, at operation 7, the display engine 610 also sends the rendered screen data to the screenshot generation module 620. Operations 4-7 in FIG. 6 are similar to operations 3-6 as described above with respect to FIG. 4.

In response to the session state request from the OS 605 at operation 3, at operation 8, application 1 sends application-specific metadata that is configured to facilitate recreation of one or more characteristics of a current session state of application 1 to the screenshot generation module 620. The specific data or parameters contained within the application-specific metadata sent by application 1 at operation 8 can be (i) specified by the session state request from the OS 605, (ii) specified by application 1 or (iii) any combination thereof. In other words, the session state request at operation may ask for specific types of information, or may simply ask the target application(s) to provide application-specific metadata while deferring to the target application(s) in terms of what specific data to include, or some combination thereof. As will be described below in more detail, the application-specific metadata requested from application 1 can be used to recreate one or more characteristics of the session state of application 1 when the application-specific image data for application 1 is sent to the display engine 610 (as in operation 4) or provided to the display screen for output (as in operation 6). At operation 9, applications 2 . . . N may also optionally send application-specific metadata that is configured to facilitate recreation of one or more characteristics of a current session state of applications 2 . . . N to the screenshot generation module 620. Operation 9 is optional because applications 2 . . . N may not be contributing image data (because operation 5 is optional) or may be contributing image data to an area that is outside of the relevant screen area to be captured in the screenshot (e.g., display screen 630 includes first and second display screens, with applications 2 . . . N only contributing image data to a display screen not designated for the screen shot, display screen 630 includes first and second windows, with applications 2 . . . N only contributing image data to a window not designated for the screen shot, etc.).

Referring to FIG. 6, the screenshot generation module 620 generates the screenshot based on the rendered screen data as well as any application-specific metadata received from applications 1 . . . N. The screenshot may also be generated based on certain file-specific (or application-generic) metadata (e.g., time of screen capture, filename, file size, etc.). The combination of the screenshot and the application-specific metadata is denoted in FIG. 6 as "screenshot+". At operation 10, the screenshot generation module 620 sends the generated (or captured) screenshot+ to the memory 635, where the screenshot+ is stored among a set of stored screenshots+1 . . . N. As noted above with respect to block 515 of FIG. 5, each screenshot+ may correspond to a single screenshot file that includes the application-specific metadata either as media watermark or embedded via supplemental header information, or alternatively to two separate files that are linked or associated with each other in memory. Also, in other embodiments, screenshot+ may be comprised of the application-specific metadata without the associated captured image data (e.g., to save memory, etc.).

Figure 7:
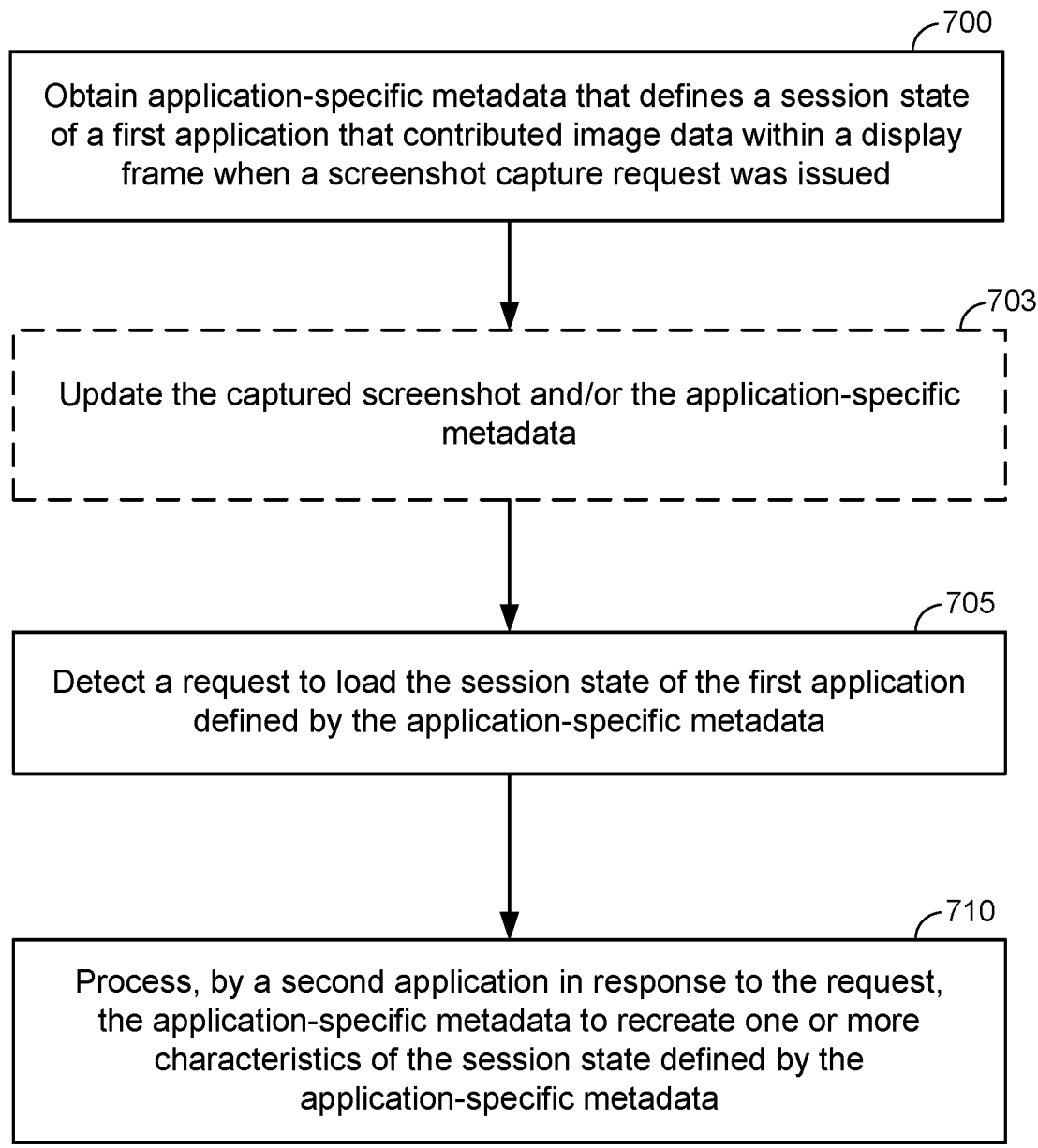
FIG. 7 illustrates a process of recreating one or more characteristics of an application session state at the time of screenshot capture in accordance with an embodiment of the disclosure.

FIG. 7 illustrates a process of recreating one or more characteristics of an application session state at the time of screenshot capture in accordance with an embodiment of the disclosure. The process of FIG. 7 may be implemented at the same UE that captured the screenshot, or alternatively may be implemented at a different UE. For example, the UE that executes the process of FIG. 5 may share a captured screenshot with application-specific metadata (or screenshot+) with a social networking service, which may then disseminate the captured screenshot and application-specific metadata with third-party UEs that then execute the process of FIG. 7. In another example, the UE that executes the process of FIG. 5 may share a captured screenshot with application-specific metadata (or screenshot+) with another UE in some other manner (e.g., a P2P or D2D file exchange, via email or a texting service, et c.), which may then execute the process of FIG. 7. In yet another example, it is possible that the UE capturing the screenshot shares the application-specific metadata without actually sharing the associated screenshot carrying the captured image data. In this case, the target UE with which the application-specific metadata is shared may still recreate some or all of the application session state using the application-specific metadata. In yet another example, it is possible that the application-specific metadata is stored at block 515 without the screenshot actually being captured and stored, as noted above with respect to block 510, in which case the UE that received the request to capture the screenshot at block 500 (but opted not to do so) may still share the application-specific metadata. Accordingly, reference to screenshot+ below at least includes some or all of the application-specific metadata, but may not necessarliy include an actual captured screenshot.

Referring to FIG. 7, at block 700, the UE obtains application-specific metadata that defines a session state of the first application that contributed image data within a display frame when a screenshot capture request was issued (e.g., in a captured screenshot of the image data). Relative to when block 700 is executed, the application-specific metadata defines an historical session state of the first application that is not necessarily representative of a current session state of the first application. In an example, if the UE of FIG. 7 corresponds to the same UE that performed the process of FIG. 5, then block 700 may correspond to the UE loading the application-specific data from memory. In another example, if the UE of FIG. 7 corresponds to a different UE than the UE that performed the process of FIG. 5, then block 700 may correspond to the UE receiving the application-specific data from an external source (e.g., the UE that performed the process of FIG. 5, or some intermediate entity such as an intermediate UE or the server 170 performing a social media-sharing function as part of a social networking service).

Referring to FIG. 7, at block 703, the UE optionally updates the captured screenshot (if available) and/or the application-specific metadata. If block 703 is performed, then the updated captured screenshot and/or application-specific metadata may be used for subsequent processing of screenshot+. Block 703 may be performed similarly to block 520 of FIG. 5, and as such will not be described further for the sake of brevity.

Referring to FIG. 7, at block 705, the UE detects a request to load the session state of the first application defined by the application-specific metadata. In one example where the application-specific metadata is obtained at block 700 in conjunction with the image data for captured screenshot, the detection at block 705 of FIG. 7 corresponds to a user clicking on an icon (or thumbnail) representing the screenshot, which results in processing of the application-specific metadata instead of (or in addition to) displaying the raw image data in the captured screenshot. In an alternative example where the application-specific metadata is obtained at block 700 without the captured screenshot, the detection at block 705 of FIG. 7 may occur in a variety of ways, such as a pull-down menu that lists user-selectable application session states that can be loaded, and so on.

Referring to FIG. 7, at block 710, the UE processes, by a second application in response to the request detected at block 705, the application-specific metadata to recreate one or more characteristics of the session state defined by the application-specific metadata. In an example, the second application that processes the application-specific metadata at block 710 may correspond to the same application (e.g., same platform or OS, same version number, etc.) as the first application at block 505 of FIG. 5, although this is not strictly necessary. For example, the respective applications may have different versions (e.g., Pandora iOS version 6 vs. Pandora iOS version 8), may operate on different platforms (e.g., a mobile Safari browser on an iOS device vs. a desktop Safari browser on a Mac computer), or may be different applications in the same application class (e.g., a desktop Chrome browser vs. a desktop Firefox browser). In an example, the application-specific metadata may include a version table that lists particular actions to be taken to recreate the session state of the first application based on a version (e.g., mobile and desktop versions, particular versions of an application for a particular OS, etc.) of an application that is attempting to recreate the session state of the first application. For example, for a Google Maps application session state, the application-specific metadata may include, as part of the version table, first instructions for session state recreation by a mobile Google Maps application, second instructions for session state recreation by a mobile or desktop web browser application that navigates to the Google Maps website for session state recreation, third instructions for session state recreation by a different map application (e.g., Apple Maps on iOS if Google Maps unavailable, etc.), and so on. Irrespective of whether the first and second applications are different (e.g., in terms of application type such as Pandora vs. Spotify, in terms of OS such as iOS vs. Windows XP vs. Android, in terms of application class such as a web browser or a dedicated map application, in terms of application-specific version number such as iOS 7-compatible Pandora vs. iOS 10-compatible Pandora, etc.), the second application is assumed to be capable of interpreting the application-specific metadata in a manner that recreates at least some features of the session state of the first application when the screenshot was captured.

Still referring to FIG. 7, it is possible that the second application cannot interpret the application-specific metadata for recreation of the one or more characteristics of the session state (e.g., the first application may be unrecognized, any URLs or URIs may be invalid, etc.). In this case, the captured screenshot (if obtained along with the application-specific metadata at block 700) may be evaluated in an attempt to derive information by which the one or more characteristics of the session state can be recreated. For example, a brute-force scheme can be used whereby OCR analysis and/or computer vision image similarity matching may be used to find a closest match to the captured screenshot in one or more applications (e.g., various screen options of a set of applications can be compared against the captured screenshot to find the closest match). In another example, assume that the captured image includes image data depicting a particular video frame of a video, and the application-specific metadata does not include deep-linking URI identifying the particular video frame of the video. Similar to the approach noted above, a brute-force scheme can be used whereby the image data related to the video can be compared against video frames of the video to identify the correct video frame (e.g., using computer vision similarity matching).

Figure 8:
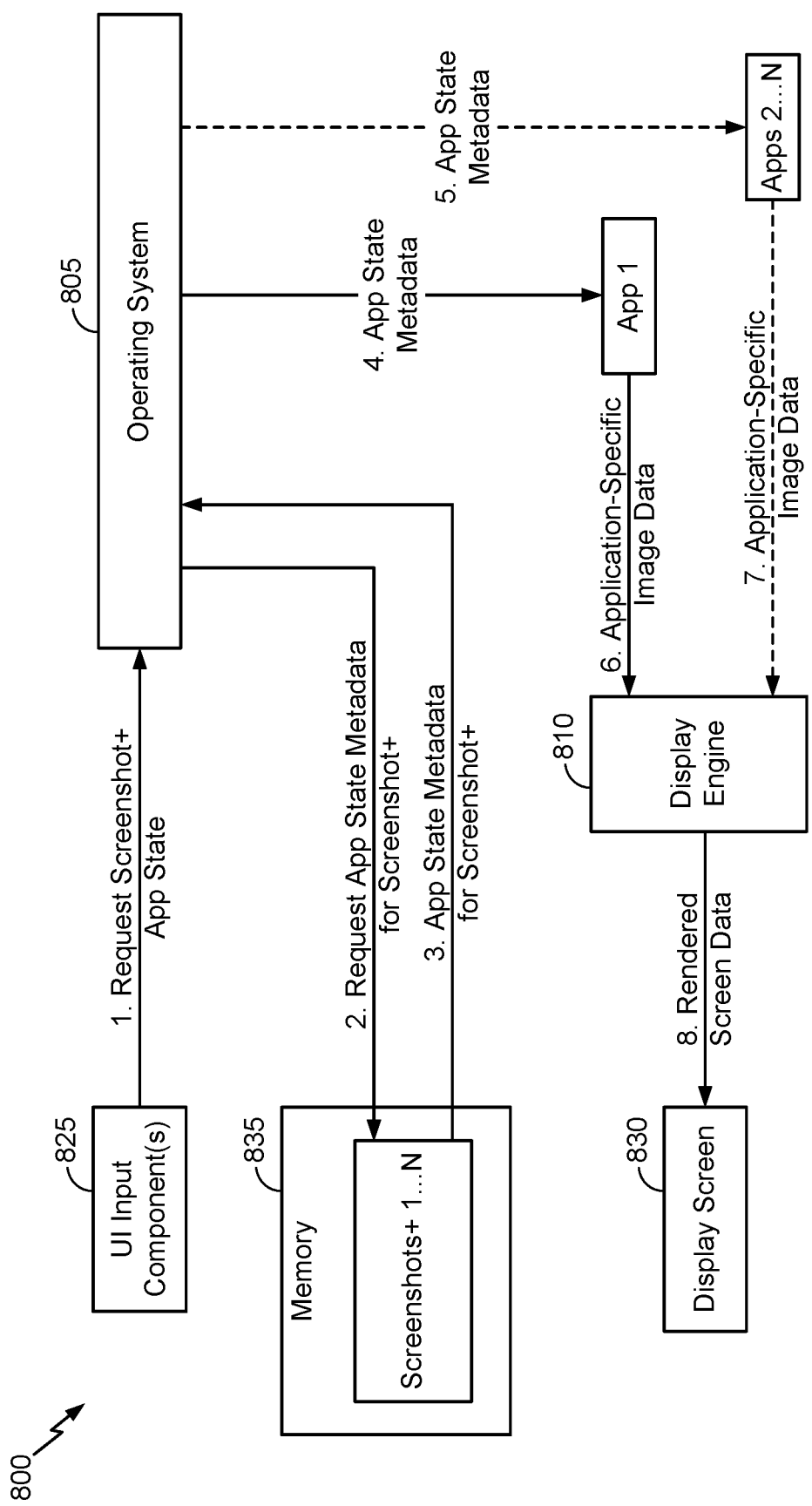
FIG. 8 illustrates an example of component interaction in association with recreation of an application session state in a UE operating environment in accordance with an embodiment of the disclosure.

FIG. 8 illustrates an example of component interaction in association with recreation of an application session state in a UE operating environment 800 in accordance with an embodiment of the disclosure. In terms of components, the UE operating environment 800 is similar to the UE operating environment 600 of FIG. 6, although the screen generation module 620 is omitted because screen capture generation is not relevant to the functionality depicted in FIG. 8. As noted above, the UE performing the processes of FIGS. 5 and 7 may be the same, in which case the UE operating environments 600 and 800 correspond to different functional representations of the same UE. Alternatively, the UE performing the processes of FIGS. 5 and 7 may be different, in which case the respective components may be the same or different (e.g., OS 605 of FIG. 6 may be iOS while OS 805 of FIG. 8 may be a Windows OS or Android, etc.)

Referring to FIG. 8, the UE operating environment 800 includes an OS 805, a display engine 810 (e.g., one or more graphics device drivers, a graphics card, a dedicated graphics kernel, etc.) and UE-executable applications 1 . . . N (e.g., stored in associated memory at the UE, where N is greater than or equal to 2). The UE operating environment 800 further includes UI input component(s) 825 (e.g., corresponding to 215 of FIG. 2, 325 of FIG. 3, etc.), a display screen 830 (e.g., corresponding to 220 of FIG. 2, 320 of FIG. 3, etc.) and a memory 835 (e.g., corresponding to 210 of FIG. 2, 315 of FIG. 3, etc.). In the example depicted in FIG. 8, the memory 835 includes a set of screenshots+1 . . . N. In an example, each screenshot+ retained in the memory 835 may include both the application-specific metadata for a particular screenshot+ along with the raw image data from the captured screenshot, or alternatively the application-specific data may be retained without the associated raw image data for at least one of the screenshots+.

Referring to FIG. 8, an example implementation of the process of FIG. 7 is depicted via operations enumerated as 1 through 8. The specific order in which operations 1 through 8 are performed may vary by implementation (e.g., operations 2 and 3 can occur in any order, etc.). At operation 1, a screenshot+ application session state request is detected by the OS 805 via the UI input component(s) 425. For example, operation 1 may correspond to a user clicking on an icon representing a particular screenshot+ (e.g., a user scrolls through a photo gallery on their phone and then selects the screenshot+, which is visually represented by a thumbnail of the image data portion of the screenshot+). At operation 2, the OS 805 sends a request for the application-specific metadata for the designated screenshot+ to the memory 835. At operation 3, the memory 835 returns the application-specific metadata for the designated screenshot+ to the US 805.

Referring to FIG. 8, at operation 4, at least some of the obtained application-specific metadata is sent to application 1. As noted above, application 1 that provided the application-specific metadata at operation 8 of FIG. 6 need not be the same as application 1 that receives the application-specific metadata at operation 4 of FIG. 8, although this is certainly possible. Rather, the respective application is from FIGS. 6 and 8 may vary in terms of version number, OS-type or may correspond to different applications in the same class (e.g., different type of web browsers or word processing applications, etc.). Application-specific metadata may optionally be obtained for multiple applications in association with the same screenshot+, as depicted above with respect to operation 9 and applications 2 . . . N in FIG. 6. Likewise, at optional operation 5, at least some of the application-specific metadata may be sent to applications 2 . . . N. In an example, the application-specific metadata optionally sent to applications 2 . . . N in FIG. 8 may correspond to the application-specific metadata that was optionally obtained for applications 2 . . . N in FIG. 6. In an alternative example, even if application-specific metadata is obtained for applications 2 . . . N in FIG. 6, this application-specific metadata need not be sent to applications 2 . . . N in FIG. 8 (e.g., the user may not wish to recreate the session state(s) of these particular application(s), the application-specific metadata from these particular applications may have been stripped out or removed in accordance with an information privacy scheme, etc.). Also, as noted above with respect to application 1 in FIG. 6 as compared with FIG. 8, the applications 2 . . . N may correspond to the same application or may be different (e.g., in terms of version number, OS-type, etc.).

Referring to FIG. 8, application 1 processes the application-specific metadata received at operation 4, and applications 2 . . . N also optionally process the application-specific metadata received at operation 5. Examples of how the application-specific metadata may be processed are provided below in more detail. A result of the processing of the application-specific metadata is conveyed to the display engine 810 by application 1 at operation 6, and (optionally) by applications 2 . . . N at operation 7, as application-specific image data to be rendered within a display frame for output by the display screen 830. While not shown explicitly in FIG. 8, it will be appreciated that other types of output may be provided based on the processing of the application-specific metadata as well (e.g., audio and/or vibratory output, etc.). At operation 8, the display engine 810 sends rendered screen data to the display screen 830 based on the application-specific image data from application 1 (and optionally, applications 2 . . . N as well).

Figure 9:
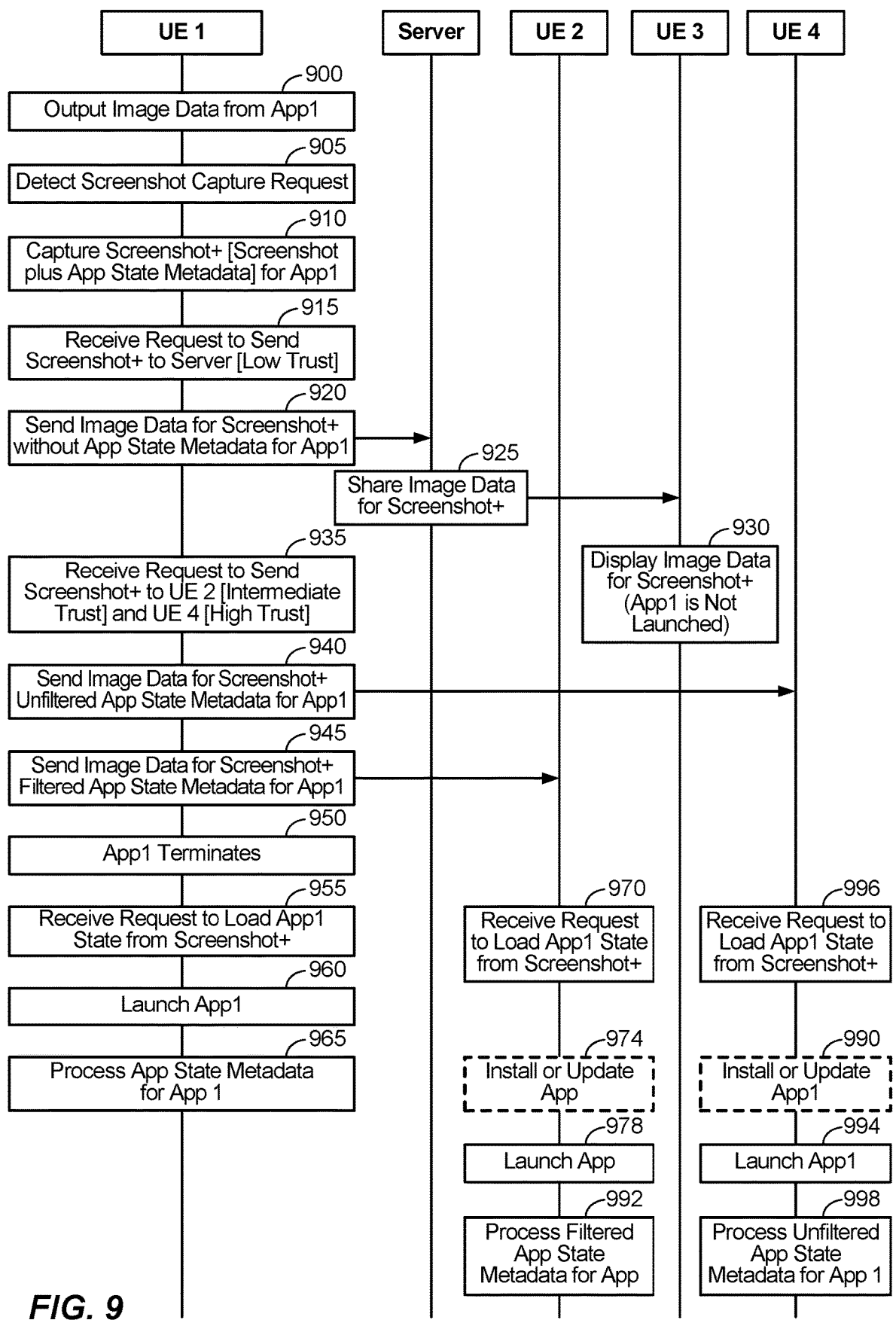
FIG. 9 illustrates an example implementation of the processes of FIGS. 5 and 7 in accordance with an embodiment of the disclosure.

FIG. 9 illustrates an example implementation of the processes of FIGS. 5 and 7 in accordance with an embodiment of the disclosure. In particular, FIG. 9 demonstrates an example whereby a different amount or type of application-specific metadata is shared based on a degree of trust that the source UE (or UE 1) has with a particular target device. FIG. 9 also demonstrates an example whereby a single application is contributing all of the relevant image data in a section of a display frame that is relevant to a screenshot. In an example, this may occur either when the single application is operating in full-screen mode, or where the boundaries of the screenshot are oriented over a portion of the display frame where the single application is the only application contributing image data. For the sake of convenience, the process of FIG. 9 below is described below with respect to the single application (or application 1), although it is possible that there are areas of the display frame outside of the screenshot area where other applications (or different instances of the same application) are contributing image data. FIG. 9 also represents an example whereby UE 1 self-captures the screenshot+, as opposed to the scenario where a UE may take a snapshot of another UE's display screen to generate the screenshot+ as described above.

Referring to FIG. 9, at block 900, image data contributed by application 1 is being output in a display frame on a display screen of UE 1. At block 905, a screenshot capture request is detected (e.g., as in block 500 of FIG. 5). At block 910, a screenshot+ is captured, whereby screenshot+ contains a screenshot plus application-specific metadata for application 1 (e.g., as in blocks 505-515 of FIG. 5).

Referring to FIG. 9, at block 915, UE 1 receives a request to send screenshot+ to a server (e.g., such as server 170, which may correspond to a social networking server in an example). In the embodiment of FIG. 9, assume that UE 1 has a low level of trust in the server (e.g., a trust score for the server is below a first trust threshold). At block 920, the raw image data for screenshot+ is sent to the server in response to UE 1's low level of trust in the server. In an example, a filtering operation may execute at UE 1 to remove any potentially sensitive application-specific metadata from a screenshot file containing the raw image data to produce the version of the screenshot+ that is sent to the server at block 920. In an alternative example, if the screenshot file for screenshot+ containing the raw image data is stored separately from a file containing the application-specific metadata for application 1, the screenshot file for screenshot+ can be uploaded to the server at block 920 without modification (but without attaching the separate file containing the application-specific metadata). At block 925, the server shares the image data for screenshot+ with UE 3. At block 930, UE 3 accesses the image data for screenshot+ in a conventional manner by simply displaying the image data (e.g., similar to any other image file) without launching application 1 (or a comparable application to application 1). While blocks 915-930 describe a scenario where the server redistributes the image data for screenshot+, it will be appreciated that the server in this scenario is representative of any intermediate device. In other embodiments, UE 1 may have low trust in another UE and send only the image data for screenshot+ to the low-trusted UE. The low-trusted UE may then redistribute the image data for screenshot+ to one or more other devices, similar to the server at blocks 925-930.

Referring to FIG. 9, at block 935, UE 1 receives a request to send screenshot+ to UEs 2 and 4. In the embodiment of FIG. 9, assume that UE 1 has an intermediate level of trust in UE 2 (e.g., a trust score for UE 2 is above the first trust threshold and below a second trust threshold), and that UE 1 has a high level of trust in UE 4 (e.g., a trust score for UE 4 is above the first and second trust thresholds). In an example, the levels of trust that UE 1 has with respect to various entities may be user-specified (e.g., UE 1 labels certain entities as being family or friends, etc.) or determined from an analysis of interactions between UE 1 and the respective entities. The respective trust thresholds may also be user-specified or pre-defined as an OS setting.

Referring to FIG. 9, at block 940, the image data for screenshot+ is sent to UE 4 along with an unfiltered version of the application-specific metadata in response to UE 1's high level of trust in UE 4. At block 945, the image data for screenshot+ is sent to UE 2 along with a filtered version of the application-specific metadata in response to UE 1's intermediate level of trust in UE 2. In an example, a filtering operation may execute at UE 1 to remove certain application-specific metadata from a screenshot file to produce the version of the screenshot+ that is sent to the server at block 945, while this filtering operation is not performed for the version of screenshot+ sent to UE 4.

Referring to FIG. 9, at block 950, assume that application 1 terminates on UE 1. At block 955, UE 1 receives a request to load the application 1 session state based on the application-specific metadata for screenshot+ (e.g., as in block 705 of FIG. 7). Instead of simply loading the image data for screenshot+ as a picture file, UE 1 launches application 1 at block 960, and application 1 then processes the application-specific metadata for application 1 to recreate one or more characteristics of the application 1 session state at block 965 (e.g., as in block 710 of FIG. 7).

Referring to FIG. 9, at block 970, at some point after receiving the filtered screenshot+ from UE 1, UE 2 receives a request to load the application 1 session state from screenshot+ based on the filtered application-specific metadata for screenshot+(e.g., as in block 705 of FIG. 7). Instead of simply loading the image data for screenshot+ as a picture file, UE 2 evaluates whether an application suitable for processing the application-specific metadata for screenshot+ is available on UE 2. For example, the application-specific metadata for screenshot+ may specify a required application class (e.g., generic web browser, such that any type of web browser is acceptable), a specific required application (e.g., a Chrome browser), a required version number (e.g., Chrome iOS browser version 6 or higher, Safari iOS browser version 8 or higher, etc.) or a combination thereof (e.g., any web browser compatible with iOS version 10 or higher). In another example, the application-specific metadata for screenshot+ may include a version table that specifies different instructions to be executed for session state recreation for different versions of an application that is attempting to reconstruct the application session state, as described above. If UE 2 determines that a new application needs to be installed or an existing application needs to be updated to process the application-specific metadata, UE 2 installs or updates the application at block 974. At block 978, the application (e.g., application 1 or a comparable application to application 1 depending on application requirements set forth in the application-specific metadata as noted above) is launched, and at block 982, the application processes the filtered application-specific metadata to recreate some or all of the characteristics of the application 1 session state from screenshot+. Examples of the type of processing that may occur at block 982 are described in more detail below.

Referring to FIG. 9, at block 986, at some point after receiving the unfiltered screenshot+ from UE 1, UE 4 receives a request to load the application 1 session state from screenshot+ based on the unfiltered application-specific metadata for screenshot+ (e.g., as in block 705 of FIG. 7). Instead of simply loading the image data for screenshot+ as a picture file, UE 4 evaluates whether an application suitable for processing the application-specific metadata for screenshot+ is available on UE 4, as described above at block 974 with respect to UE 2. If UE 4 determines that a new application needs to be installed or an existing application needs to be updated to process the application-specific metadata, UE 4 installs or updates the application at block 990. At block 994, the application (e.g., application 1 or a comparable application to application 1 depending on application requirements set forth in the application-specific metadata as noted above) is launched, and at block 998, the application processes the unfiltered application-specific metadata to recreate some or all of the characteristics of the application 1 session state from screenshot+. Examples of the type of processing that may occur at block 998 are described in more detail below.

Figure 10:
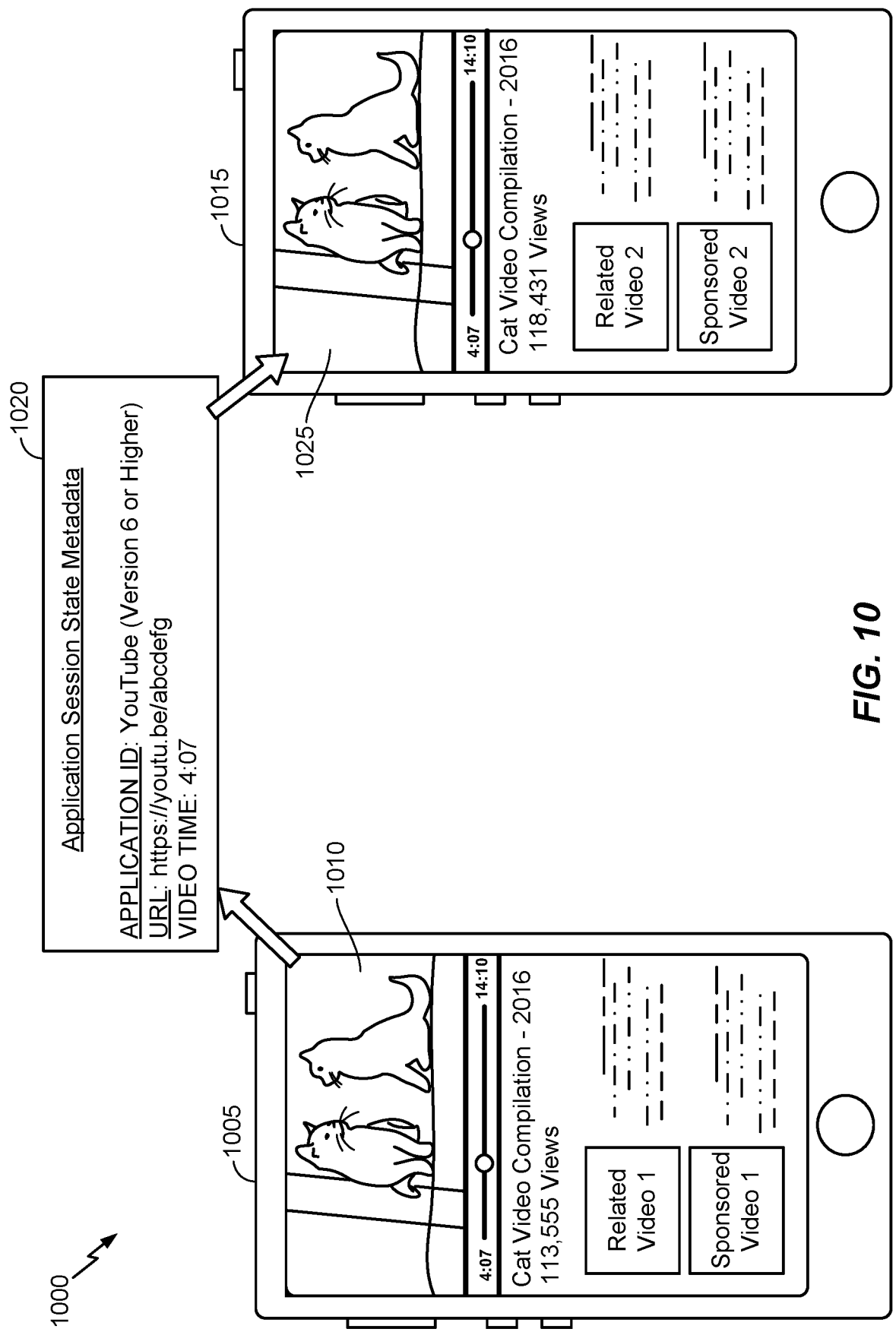
FIG. 10 illustrates an application session state recreation based on an example execution of the process of FIG. 9 in accordance with an embodiment of the disclosure.

FIG. 10 illustrates an application session state recreation 1000 based on an example execution of the process of FIG. 9 in accordance with an embodiment of the disclosure. In FIG. 10, UE 1 from FIG. 9 is illustrated as smartphone 1005, UE 4 is illustrated as smartphone 1015, and application 1 corresponds to a mobile YouTube application. Display screen 1010 represents the image data for a screenshot+ taken while the mobile YouTube application executes a video entitled "Cat Video Compilation—2016" specifically at timepoint 4:07 (4 minutes, 7 seconds) of the video which has a total length of 14:10 (14 minutes, 10 seconds). As depicted in the display screen 1010, the video currently has 113,555 total views, a related video 1 is being suggested to the user of the smartphone 1005, and a sponsored video 1 is being advertised to the user of the smartphone 1005.

An example of the application-specific metadata 1020 (or application session state metadata) that characterizes the session state of the mobile YouTube application in screenshot+ is as follows:

APPLICATION ID: YouTube (Version 6 or Higher)
Uniform Resource Locator (URL): https://youtu.be/ab-cdefg
VIDEO TIME: 4:07

Based on the application-specific metadata 1020, the smartphone 1015 (if necessary) installs or updates the mobile YouTube application, navigates to the URL "https://youtu.be/abcdefg" and advances directly to the specified 4:07 timepoint. A resultant session state of the mobile YouTube application at the smartphone 1015 is depicted in display screen 1025. It will be appreciated that the resultant session state of the mobile YouTube application as depicted in the display screen 1025 at the smartphone 1015 is not identical to the initial session state of the mobile YouTube application as depicted in the display screen 1010 at the smartphone 1005, because various parameters are changed (e.g., the number of views is different, and different related/sponsored videos are suggested/advertised). Accordingly, each characteristic of the initial session state of the mobile YouTube application need not be recreated as part of the session state recreation at the smartphone 1015 (although this may occur in certain scenarios).

Figure 11:
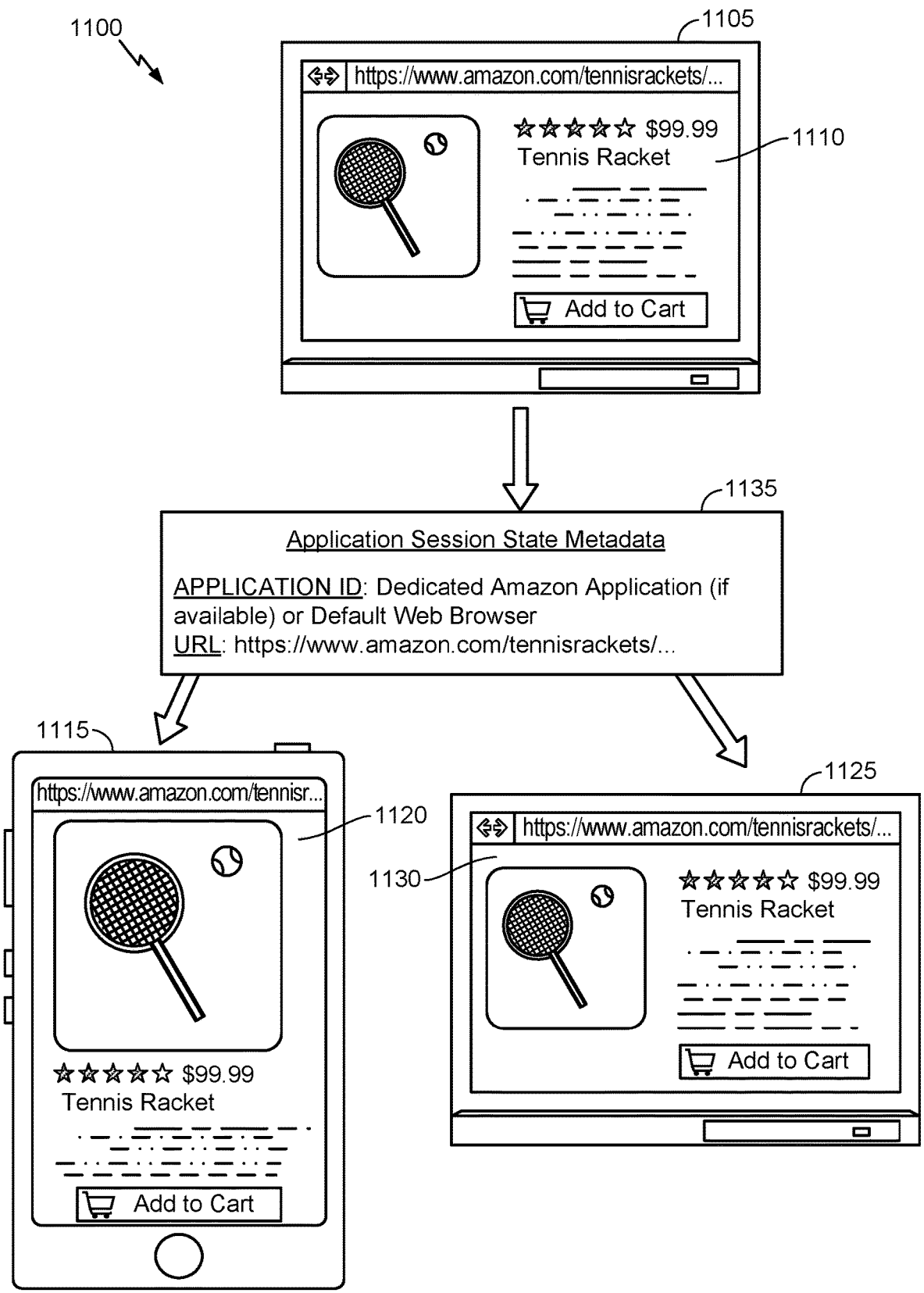
FIG. 11 illustrates an application session state recreation based on an example execution of the process of FIG. 9 in accordance with another embodiment of the disclosure.

FIG. 11 illustrates an application session state recreation 1100 based on an example execution of the process of FIG. 9 in accordance with another embodiment of the disclosure. In FIG. 11, UE 1 from FIG. 9 is illustrated as computer 1105 (e.g., a desktop or laptop computer), UE 4 is alternatively illustrated as smartphone 1115 and computer 1125 (e.g., a desktop or laptop computer), and application 1 corresponds to a web browser. Display screen 1110 represents the image data for a screenshot+ taken while the web browser displays a particular webpage (e.g., starting with https://www.amazon.com/tennisrackets/ . . . , which is a partial URL for description purposes). More specifically, a user has scrolled down within the webpage so that a particular tennis racket is listed as being on sale for $99.99.

An example of the application-specific metadata 1135 (or application session state metadata) that characterizes the session state of the web browser in screenshot+ is as follows:
APPLICATION ID: Dedicated Amazon Application (if available) or Default Web Browser
URL: https://www.amazon.com/tennisrackets/ . . .

Based on the application-specific metadata 1135, the smartphone 1115 checks whether a dedicated Amazon application is already installed on the smartphone 1115. If so, the dedicated Amazon application is used to load the product page that corresponds to the specified URL. If not, the default web browser on the smartphone 1115 (e.g., a mobile web browser) navigates to the specified URL, as shown within display screen 1120. The resultant session state of the mobile web browser at the smartphone 1115 as depicted in display screen 1120 is not identical to the initial session state of the web browser as depicted in the display screen 1110 at the smartphone 1105, because various parameters are changed (e.g., the smartphone 1115 is redirected to a mobile version of the URL, etc.).

As noted above, computer 1125 is another target device that receives the screenshot+ in addition to the smartphone 1115. Based on the application-specific metadata 1135, the computer 1125 checks whether a dedicated Amazon application is already installed on the computer 1125. If so, the dedicated Amazon application is used to load the product page that corresponds to the specified URL. If not, the default web browser on the computer 1125 (e.g., a full-featured or non-mobile web browser) navigates to the specified URL, as shown within display screen 1130. In an example, a scroll-position at which the web site is being viewed on display screen 1110 may also be recorded as part of the application-specific metadata 1135, such that the web browser at the computer 1125 may load the specified URL and also shift the scrollbar down to the same point as recorded in the application-specific metadata 1135 to more closely recreate the session state defined by screenshot+.

Figure 12A:
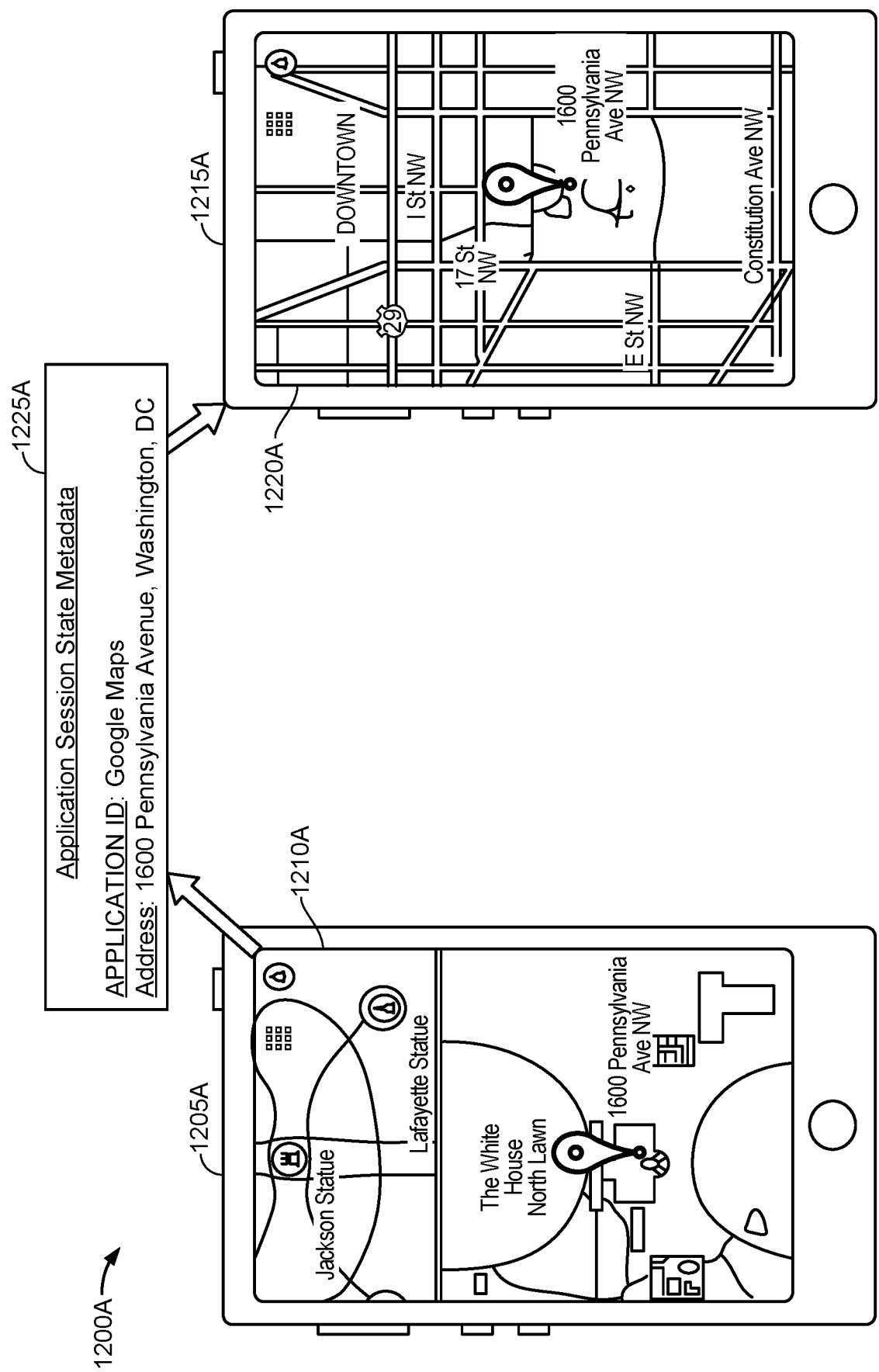
FIG. 12A illustrates an application session state recreation based on an example execution of the process of FIG. 9 in accordance with another embodiment of the disclosure.

FIG. 12A illustrates an application session state recreation 1200A based on an example execution of the process of FIG. 9 in accordance with another embodiment of the disclosure. In FIG. 12A, UE 1 from FIG. 9 is illustrated as smartphone 1205A, UE 4 is illustrated as smartphone 1215A, and application 1 corresponds to a mobile Google Maps application. Display screen 1210A represents the image data for a screenshot+ taken while the mobile Google Maps application is centered on a particular target address (e.g., 1600 Pennsylvania Avenue, Washington, D.C., which is the address of the White House).

An example of the application-specific metadata 1225A (or application session state metadata) that characterizes the session state of the mobile Google Maps application in screenshot+ is as follows:
APPLICATION ID: Google Maps
Address: 1600 Pennsylvania Avenue, Washington, D.C.

Based on the application-specific metadata 1225A, the smartphone 1215A checks whether a Google Maps application (e.g., a mobile Google Maps application because smartphone 1215A is a mobile device) is already installed on the smartphone 1215A. If not, in an example, the user is prompted to download and install the mobile Google Maps application, or alternatively the mobile Google Maps application is downloaded and installed automatically. The mobile Google Maps application then processes the application-specific metadata 1225A entering 1600 Pennsylvania Avenue, Washington, D.C. as a target address, resulting in display screen 1220A being centered around the White House. In an example, zoom information (e.g., specific geographical boundaries, a scale of zoom, etc.) at which the White House is being viewed on display screen 1210A may also be recorded as part of the application-specific metadata 1225A, such that the mobile Google Maps application at the smartphone 1215A may load the target address at a target level of zoom that is commensurate with the depiction of the target address in the display screen 1210A.

Figure 12B:
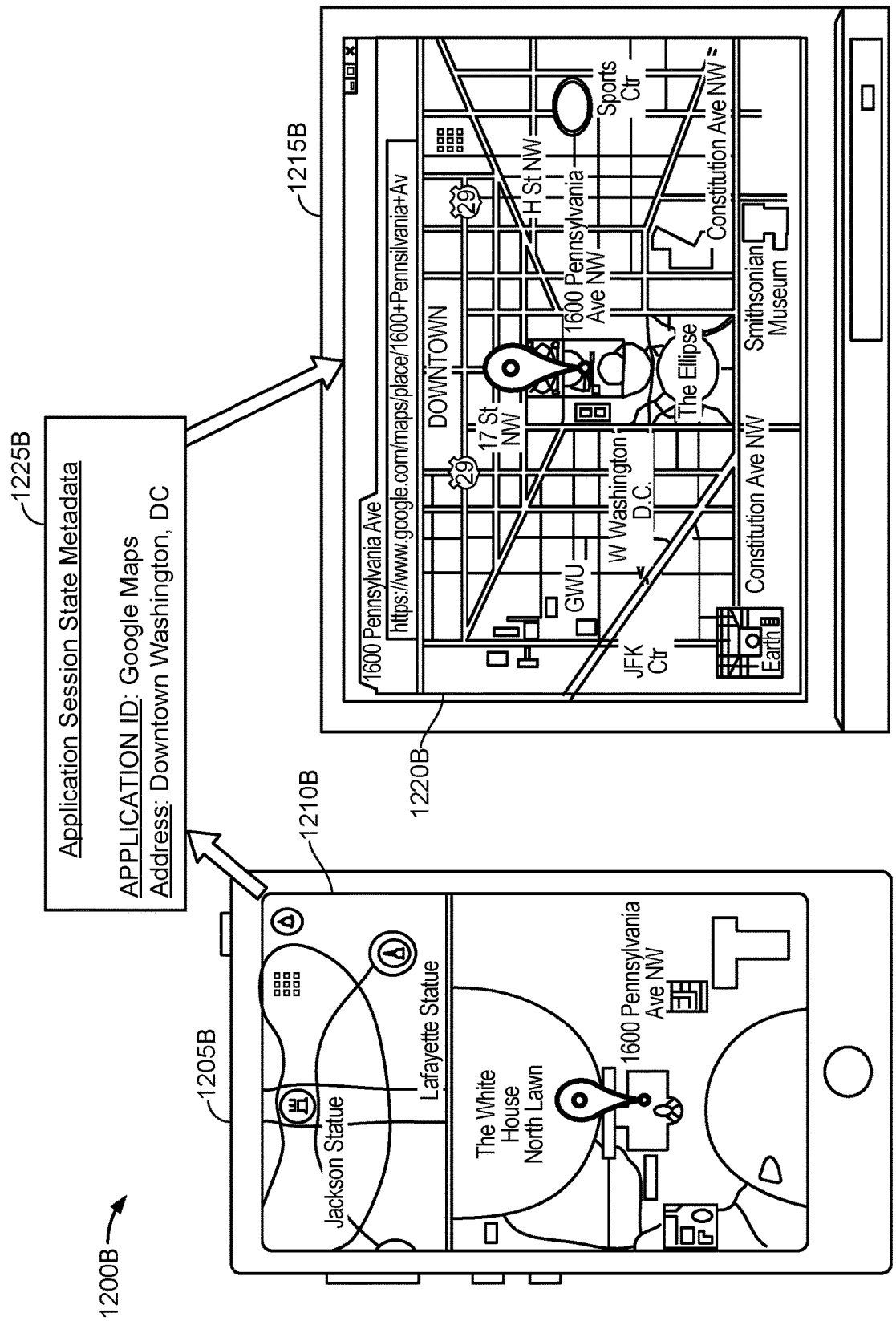
FIG. 12B illustrates an application session state recreation based on an example execution of the process of FIG. 9 in accordance with another embodiment of the disclosure.

FIG. 12B illustrates an application session state recreation 1200B based on an example execution of the process of FIG. 9 in accordance with another embodiment of the disclosure. In FIG. 12B, UE 1 from FIG. 9 is illustrated as smartphone 1205B, UE 2 is illustrated as computer 1215B (e.g., a desktop or laptop computer), and application 1 corresponds to a mobile Google Maps application. Display screen 1210B represents the image data for a screenshot+ taken while the mobile Google Maps application is centered on a particular target address (e.g., 1600 Pennsylvania Avenue, Washington, D.C., which is the address of the White House).

An example of filtered application-specific metadata 1225B (or application session state metadata) that characterizes the session state of the mobile Google Maps application in screenshot+ is as follows:
APPLICATION ID: Google Maps
Address: Downtown Washington, D.C.

The application-specific metadata 1225B is characterized as filtered because the more specific address of 1600 Pennsylvania Avenue, Washington, D.C. is obscured from the application-specific metadata 1225B and replaced with a more generic "Downtown" designation, similar to blocks 935 and 945 with respect to UE 2 in FIG. 9. For example, 1600 Pennsylvania Avenue, Washington, D.C. may correspond to a current or future location of the smartphone 1205B, which the user of the smartphone 1205B may not necessarily want to share with the computer 1215B (e.g., a precise location may not wish to be shared over a social network or with friends at an intermediate trust level, etc.). Based on the filtered application-specific metadata 1225B, the computer 1215B checks whether a Google Maps-compatible application is already installed on the computer 1215B. In this case, assume that the computer 1215B determines a default web browser navigating to the Google Maps website qualifies as a suitable Google Maps application. Accordingly, the default web browser (e.g., depicted as a Chrome browser) processes the application-specific metadata 1225B by entering Downtown, Washington, D.C. as a target address (or target region), resulting in display screen 1220B being centered around downtown Washington, D.C. By virtue of the metadata filtering noted above, the perspective of Washington, D.C. in the display screen 1220B is more zoomed-out relative to the depiction of the more specifically defined address in the session state of the mobile Google Maps application in display screen 1210B.

Figure 13:
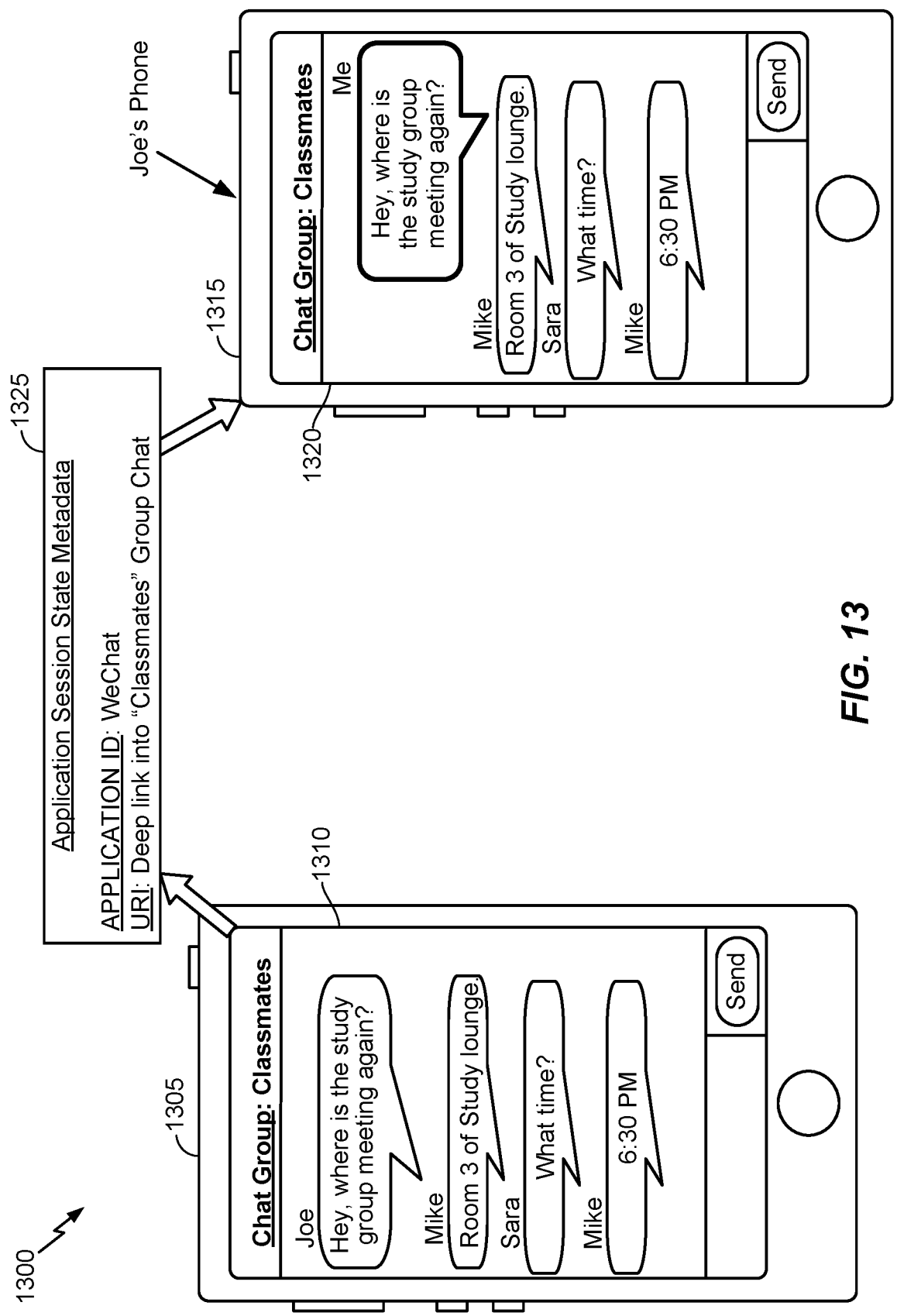
FIG. 13 illustrates an application session state recreation based on an example execution of the process of FIG. 9 in accordance with another embodiment of the disclosure.

FIG. 13 illustrates an application session state recreation 1300 based on an example execution of the process of FIG. 9 in accordance with another embodiment of the disclosure. In FIG. 13, UE 1 from FIG. 9 is illustrated as smartphone 1305, UE 4 is illustrated as smartphone 1315, and application 1 corresponds to a mobile WeChat application (e.g., a group messaging application). Display screen 1310 represents the image data for a screenshot+ taken while the mobile WeChat application illustrates a particular section of a chat conversion among a particular chat group "Classmates".

An example of the application-specific metadata 1325 (or application session state metadata) that characterizes the session state of the mobile WeChat application in screenshot+ is as follows:

APPLICATION ID: WeChat
  Uniform Resource Identifier (URI): Deep link into "Classmates" Group Chat Based on the application-specific metadata 1325, the smartphone 1320 (which is assumed to be operated by a user named "Joe") checks whether a WeChat application (e.g., a mobile WeChat application because smartphone 1315 is a mobile device) is already installed on the smartphone 1315. Assuming the mobile WeChat application is installed, the mobile WeChat application processes the deep link specified in the URI of the application-specific metadata 1325 by loading the relevant chat history and navigates directly to the portion of the chat history that is depicted in screenshot+, as shown within display screen 1320. The resultant session state of the mobile WeChat application at the smartphone 1315 as depicted in display screen 1320 is not identical to the initial session state of the mobile WeChat application as depicted in the display screen 1310 at the smartphone 1305, because various parameters are changed (e.g., smartphone 1320 is registered to user "Joe", so the mobile WeChat application designates any chat contributions from Joe as "Me" in display screen 1320 instead of designating such contributions as being from "Joe").

While FIGS. 9-13 relate to example implementations of the processes of FIGS. 5 and 7 whereby the application-specific metadata associated with a particular screenshot+ relates to a single application, it is also possible for the processes of FIGS. 5 and 7 to relate to screenshots+ that include application-specific metadata for multiple applications that contribute image data to the image data portion of the screenshots+, as will now be described with respect to FIGS. 14-16B.

Figure 14:
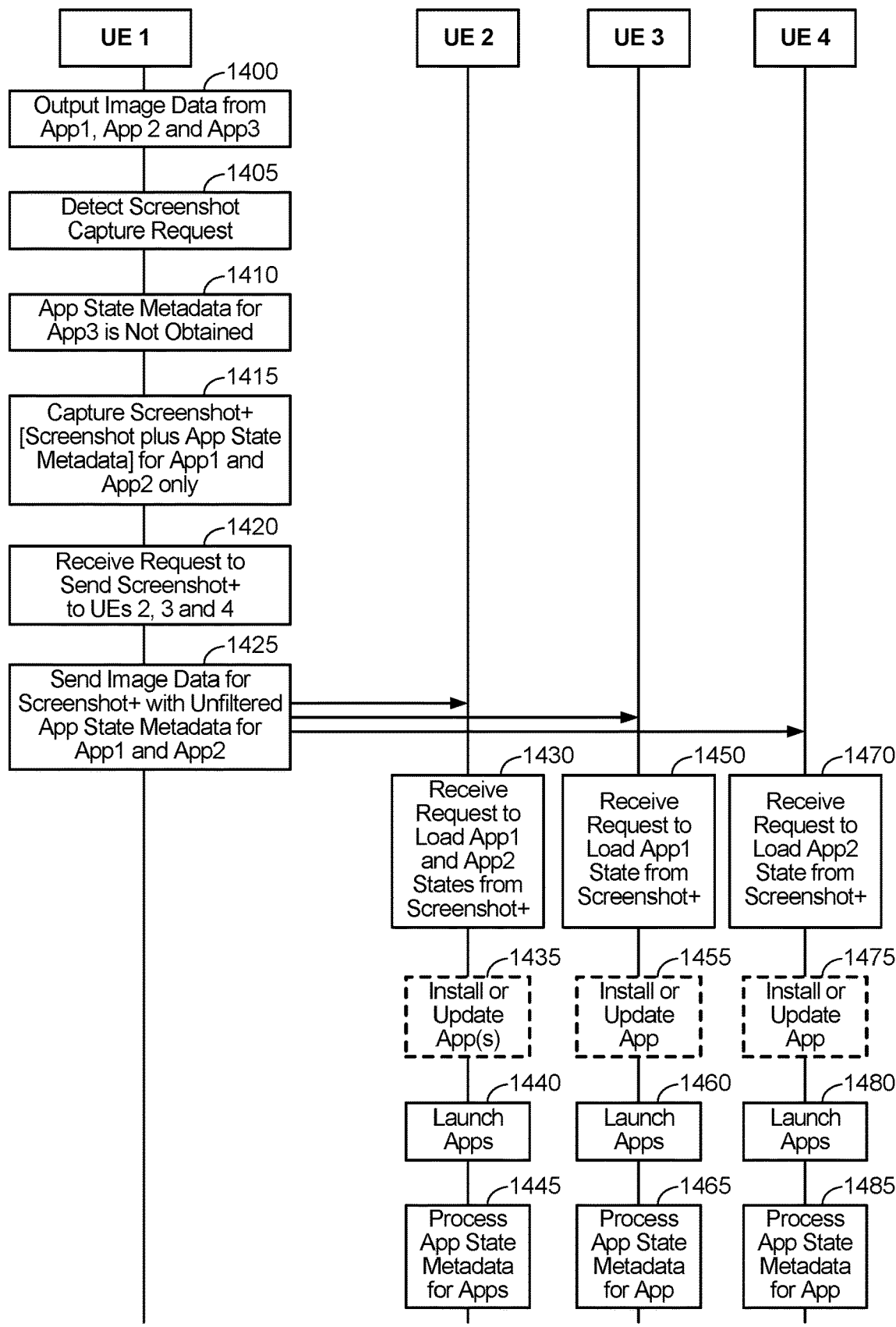
FIG. 14 illustrates an example implementation of the process of FIGS. 5 and 7 in accordance with another embodiment of the disclosure.

FIG. 14 illustrates an example implementation of the process of FIGS. 5 and 7 in accordance with another embodiment of the disclosure. In particular, FIG. 14 demonstrates an example whereby multiple applications are contributing image data to a section of a display frame that is relevant to a screenshot, with application-specific metadata associated with two or more of these multiple applications for a screenshot+ being shared with external target devices. In an example, this may occur either when the multiple applications are operating within separate windows that are each visible in the screenshot area of the display frame being output in the display screen. It is also it is possible that there are areas of the display frame outside of the screenshot area where other applications (or different instances of the same applications) are contributing image data. FIG. 14 also represents an example whereby UE 1 self-captures the screenshot+, as opposed to the scenario where a UE may take a snapshot of another UE's display screen to generate the screenshot+ as described above.

Referring to FIG. 14, at block 1400, image data contributed by applications 1, 2 and 3 is being output in a display frame on a display screen of UE 1. At block 1405, a screenshot capture request is detected (e.g., as in block 500 of FIG. 5). At block 1410, UE 1 determines that application-specific metadata that defines the current session state of application 3 cannot be obtained. In an example, the application-specific metadata for application 3 may be unavailable based on application 3 being configured as a protected application (e.g., via a security setting at the OS of UE 1, or via a security setting built into application 3 itself) that does not permit application-specific metadata to be shared as a security precaution (e.g., which may be a default security setting or a user-configured setting). In another example, the application-specific metadata for application 3 may be unavailable because application 3 is a legacy application that does not support sharing of application-specific metadata (e.g., application 3 does not know how to share information that would help to recreate characteristics of the current session state of application 3). At block 1415, a screenshot+ is captured, whereby screenshot+ contains a screenshot plus application-specific metadata for applications 1 and 2 (e.g., as in blocks 505-515 of FIG. 5).

Referring to FIG. 14, at block 1420, UE 1 receives a request to send screenshot+ to UEs 2, 3 and 4. In the embodiment of FIG. 14, for convenience of explanation, assume that metadata filtering is not performed (e.g., because a trust level is not used for selective metadata filtering or that the level of trust UE 1 has for UEs 2, 3 and 4 is high or above a highest trust threshold). However, it will be appreciated that in other embodiments metadata filtering may be performed for one or more of UEs 2, 3 and 4 as described above with respect to the server and UE 2 in the process of FIG. 9. At block 1425, the image data for screenshot+ is sent to UEs 2, 3 and 4 along with the application-specific metadata for applications 1 and 2.

Referring to FIG. 14, at block 1430, at some point after receiving the screenshot+ from UE 1, UE 2 receives a request to load the application 1 session state and the application 2 session state from screenshot+ based on the application-specific metadata for screenshot+ (e.g., as in block 705 of FIG. 7). In an example, while block 1430 depicts a request to construct both application session states, the screenshot+ may be constructed to permit selective application session state loading (e.g., load application 1 session state only, load application 2 session state only, etc.) using the application-specific metadata, as will be described below with respect to blocks 1450-1485.

Instead of simply loading the image data for screenshot+ as a picture file, UE 2 evaluates whether applications suitable for processing the application-specific metadata for the application 1 session state and the application 2 session state as depicted in screenshot+ are available on UE 2. If UE 2 determines that one or more new applications need to be installed or one or more existing applications need to be updated to process the application-specific metadata for recreation of either the application 1 session state or the application 2 session state, UE 2 installs or updates the application(s) at block 1435. At block 1440, the applications (e.g., applications 1 and 2, comparable application to applications 1 and 2, or a combination thereof, depending on application requirements set forth in the application-specific metadata as noted above) are launched, and at block 1445, the applications process the respective application 1 portion and application 2 portion of the application-specific metadata to recreate some or all of the characteristics of the application 1 session state and the application 2 session state, respectively, from screenshot+. Examples of the type of processing that may occur at block 1445 are described in more detail below.

Referring to block 1445 of FIG. 14, in an example, screen-sections depicting any image data from the recreations of the application 1 session state and the application 2 session state at UE 2 may be allocated to similar screen portions as depicted in the screenshot captured at UE 1 (e.g., if the screenshot depicts an application 1 window on the left side of the display frame and an application 2 window on the right side of the display frame, these same relative positions may be maintained in the resultant application session state recreations on UE 2). The relative screen position data may be conveyed as part of the application-specific metadata, in an example, although it is also possible that the application-specific metadata is configured without reference to relative screen position data for the respective applications.

Referring to FIG. 14, at block 1450, at some point after receiving the screenshot+ from UE 1, UE 3 receives a request to load the application 1 session state from screenshot+ based on the application-specific metadata for screenshot+ (e.g., as in block 705 of FIG. 7). In other words, UE 3 is not interested in recreating the application 2 session state. Instead of simply loading the image data for screenshot+ as a picture file, UE 3 evaluates whether an application suitable for processing the application-specific metadata for the application 1 session state as depicted in screenshot+ is available on UE 3. If UE 3 determines that a new application needs to be installed or an existing application needs to be updated to process the application-specific metadata for recreation of either the application 1 session state, UE 3 installs or updates the application(s) at block 1455. At block 1460, the application (e.g., application 1, or a comparable application to application 1, depending on application requirements set forth in the application-specific metadata as noted above) is launched, and at block 1465, the application processes the respective application 1 portion of the application-specific metadata to recreate some or all of the characteristics of the application 1 session state from screenshot+. Examples of the type of processing that may occur at block 1465 are described in more detail below.

Referring to FIG. 14, at block 1470, at some point after receiving the screenshot+ from UE 1, UE 4 receives a request to load the application 2 session state from screenshot+ based on the application-specific metadata for screenshot+ (e.g., as in block 705 of FIG. 7). In other words, UE 4 is not interested in recreating the application 1 session state (in direct contrast to UE 3 as shown in blocks 1450-1465). Instead of simply loading the image data for screenshot+ as a picture file, UE 4 evaluates whether an application suitable for processing the application-specific metadata for the application 2 session state as depicted in screenshot+ is available on UE 4. If UE 4 determines that a new application needs to be installed or an existing application needs to be updated to process the application-specific metadata for recreation of either the application 2 session state, UE 4 installs or updates the application(s) at block 1475. At block 1480, the application (e.g., application 1, or a comparable application to application 1, depending on application requirements set forth in the application-specific metadata as noted above) is launched, and at block 1485, the application processes the respective application 2 portion of the application-specific metadata to recreate some or all of the characteristics of the application 2 session state from screenshot+. Examples of the type of processing that may occur at block 1485 are described in more detail below.

Figure 15A:
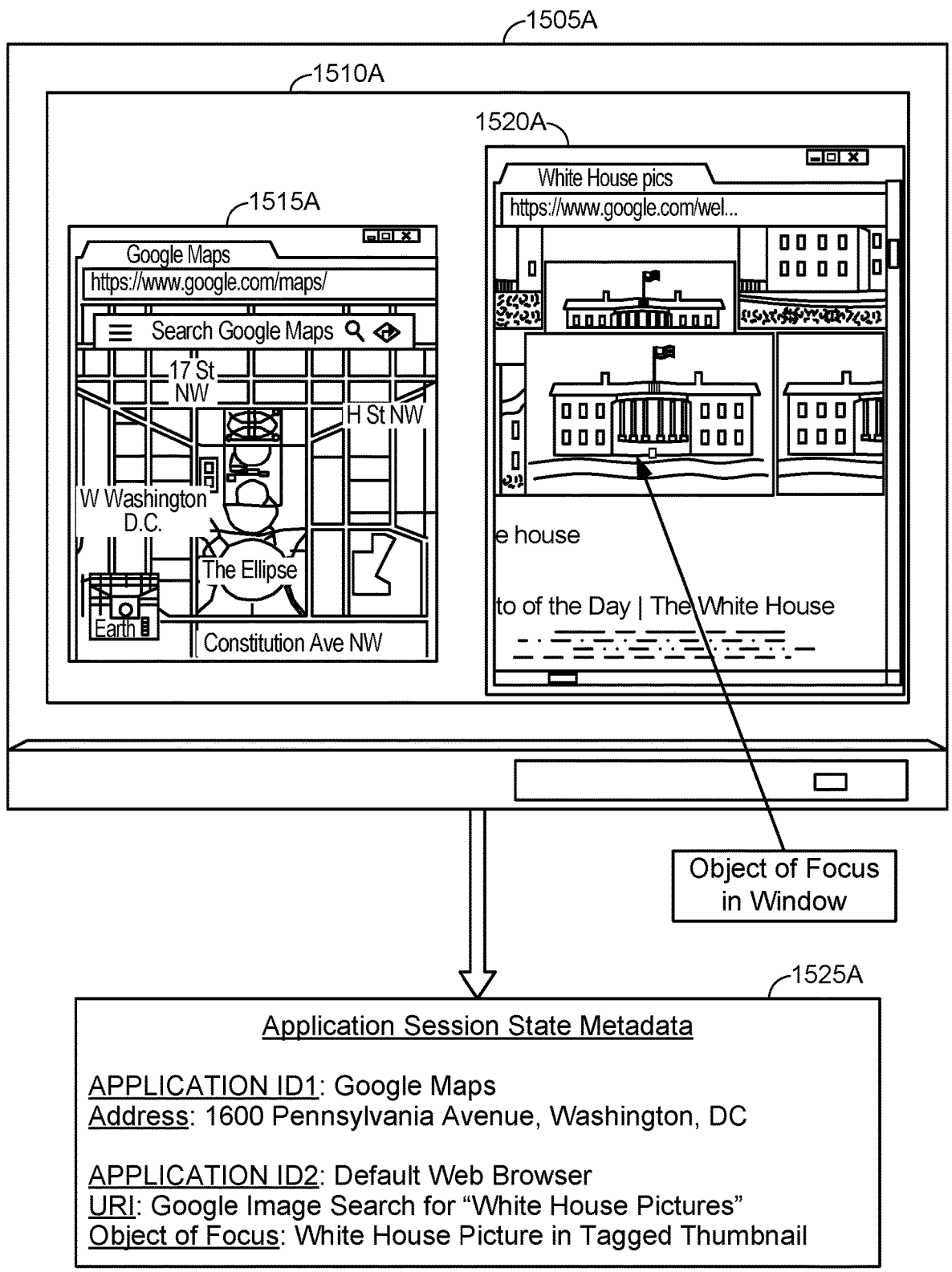
FIG. 15A illustrates an application-specific metadata generation for a screenshot+ based on an example execution of the process of FIG. 14 in accordance with an embodiment of the disclosure.

FIG. 15A illustrates an application-specific metadata generation for a screenshot+ based on an example execution of the process of FIG. 14 in accordance with an embodiment of the disclosure. In FIG. 15A, UE 1 from FIG. 14 is illustrated as computer 1505A with display screen 1510A, application 1 corresponds to a Chrome web browser that is at a Google Maps URL centered around 1600, Pennsylvania Avenue, Washington, D.C. as depicted in window 1515A of display screen 1510A, and application 2 corresponds to a different instance of the Chrome web browser that is navigated to a Google Image Search URL for "White House", as depicted in window 1520A of display screen 1510A. For example, the user operating the computer 1505A may be researching a trip to see the White House in Washington, D.C.

The window 1520A is centered on one particular thumbnail from the image search results, so this thumbnail can be identified (or tagged) as an object of focus in the for application 2 application-specific metadata. Accordingly, display screen 1510A represents the image data for a screenshot+, with an example of the application-specific metadata 1530 (or application session state metadata) that characterizes the session state of the mobile Google Maps application in screenshot+ is as follows:

APPLICATION ID1: Google Maps
Address: 1600 Pennsylvania Avenue, Washington, D.C.
APPLICATION ID2: Default Web Browser
URI: Google Image Search for "White House Pictures"
Object of Focus: White House Picture in Tagged Thumbnail As shown above, an Object of Focus field can be added to the application-specific metadata for the application 2 session state in screenshot+, which may be configured to cause the for application 2 session state to be recreated by first navigating to image search results for White House pictures as specified in the URI for the application 2 session state, and then to center the resulting web page (e.g., by auto-scrolling down to, or zooming in upon) on the particular White House picture from the tagged thumbnail as in the application 2 session state as depicted in screenshot+. In this example, the White House is an example of location-specific point-of-interest (POI) information that may be included as part of the application-specific metadata.

Figure 15B:
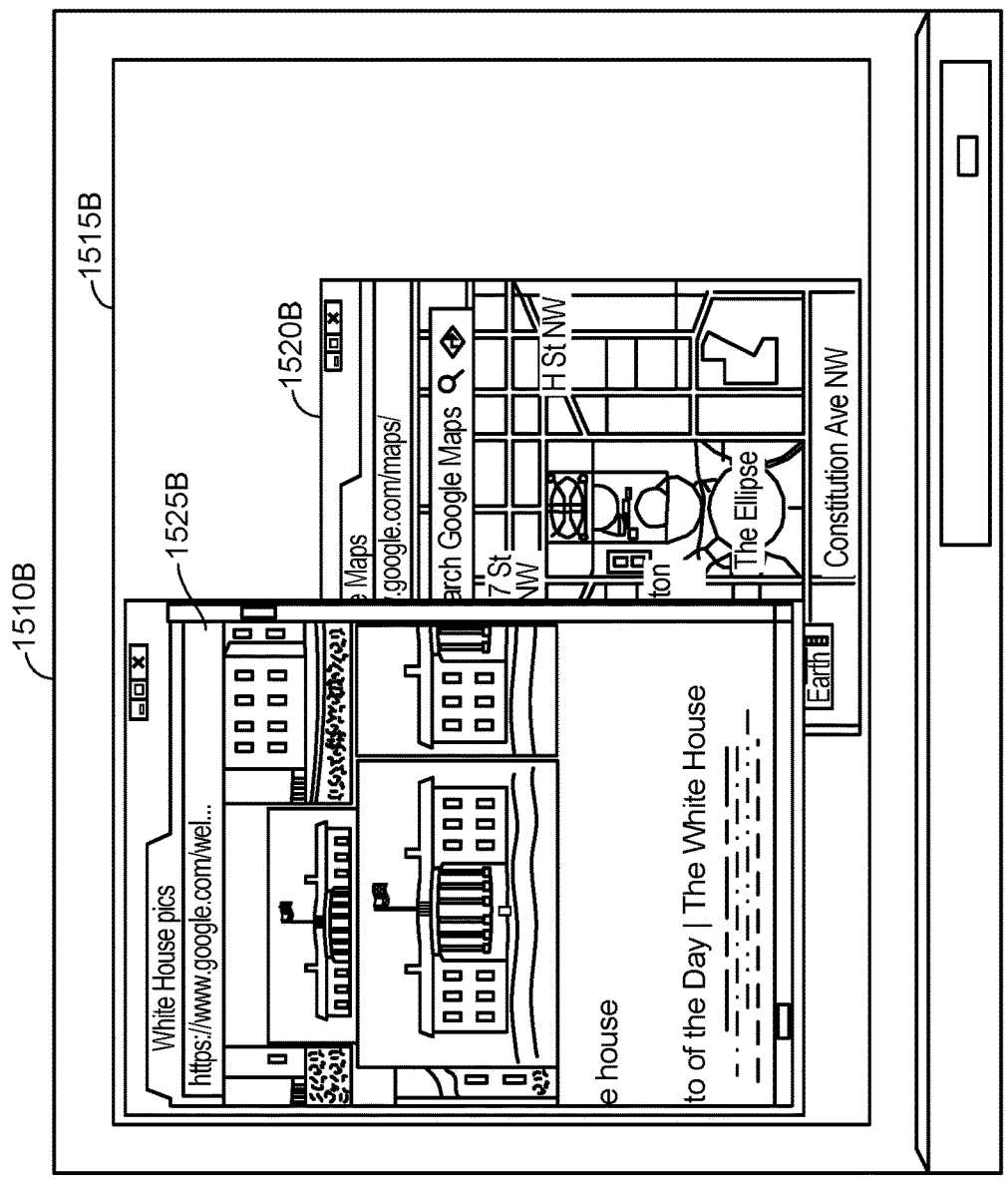
FIG. 15B illustrates an application session state recreation procedure for the screenshot+ described above with respect to FIG. 15A based on an example execution of the process of FIG. 14 in accordance with an embodiment of the disclosure.
Figure 15B:
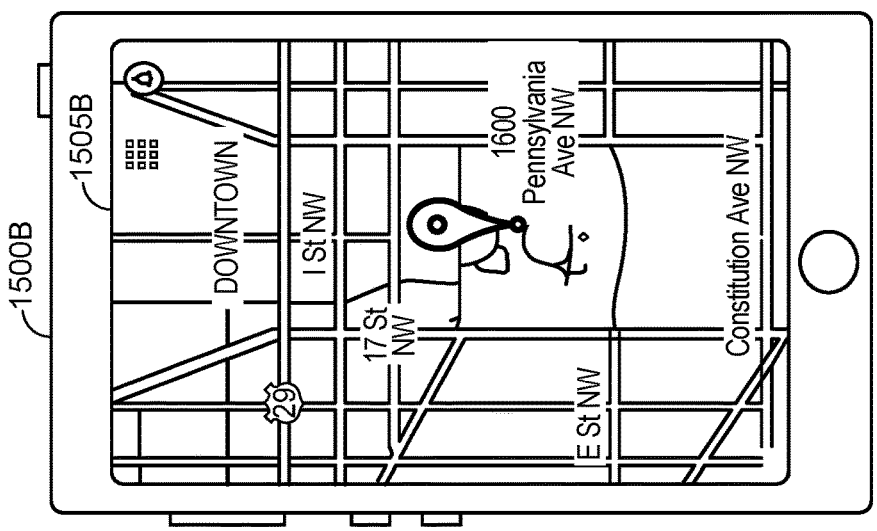

FIG. 15B illustrates an application session state recreation procedure for the screenshot+ described above with respect to FIG. 15A based on an example execution of the process of FIG. 14 in accordance with an embodiment of the disclosure. In FIG. 15B, UE 3 from FIG. 14 is illustrated as smartphone 1500B with display screen 1505B, UE 2 from FIG. 14 is illustrated as computer 1510B (e.g., a laptop or desktop computer, etc.) with display screen 1515B, with applications 1 and 2 configured as described above with respect to FIG. 15A.

Referring to FIG. 15B, the smartphone 1500B receives the application-specific metadata 1525A as described above with respect to FIG. 15A. Assume that the smartphone 1500B receives a request to load the application 1 session state only (e.g., as in block 1450 of FIG. 14). Accordingly, based on the application-specific metadata 1525A, the smartphone 1500B checks whether a Google Maps application (e.g., a mobile Google Maps application because smartphone 1500B is a mobile device) is already installed on the smartphone 1500B. If not, the mobile Google Maps application is downloaded and installed. The mobile Google Maps application then processes the application 1 portion of the application-specific metadata 1525A by entering 1600 Pennsylvania Avenue, Washington, D.C. as a target address, resulting in display screen 1505B being centered around the White House. In an example, zoom information (e.g., specific geographical boundaries, a scale of zoom, etc.) at which the White House is being viewed on display screen 1505B may also be recorded as part of the application-specific metadata 1525A, such that the mobile Google Maps application at the smartphone 1500B may load the target address at a target level of zoom that is commensurate with the depiction of the target address in the window 1515A of FIG. 15A.

Referring to FIG. 15B, the computer 1510B receives the application-specific metadata 1525A as described above with respect to FIG. 15A. Assume that the computer 1510B receives a request to load both the application 1 session state and the application 2 session state (e.g., as in block 1430 of FIG. 14). Accordingly, based on the application-specific metadata 1525A, the computer 1510B checks whether a Google Maps-compatible application is already installed on the computer 1510B for recreation of the application 1 session state, and also checks whether a web browser is already installed on the computer 1510B for recreation of the application 2 session state. In this case, assume that the computer 1510B determines a default web browser navigating to the Google Maps website qualifies as a suitable Google Maps application for recreation of the application 1 session state, with this same web browser already being sufficient to recreate the application 2 session state.

Accordingly, the default web browser (e.g., depicted as a Chrome browser) processes the application-specific metadata 1525A to recreate the application 1 session state in window 1520B and to recreate the application 2 session state in window 1525B. In particular, the window 1525B may process the application-specific metadata 1525A not only to load the proper web page with the relevant White House image results, but to center the web page around the object of focus (i.e., the tagged thumbnail from the application 2 window of screenshot+ as depicted in FIG. 15A). In an example, while not depicted in FIG. 15B, the application-specific metadata 1525A may be further configured to include relative screen position data for the respective windows such that the positional arrangement of windows 1520B-1525B aligns with corresponding windows 1515A and 1520A of FIG. 15B within the respective display screens.

Figure 16A:
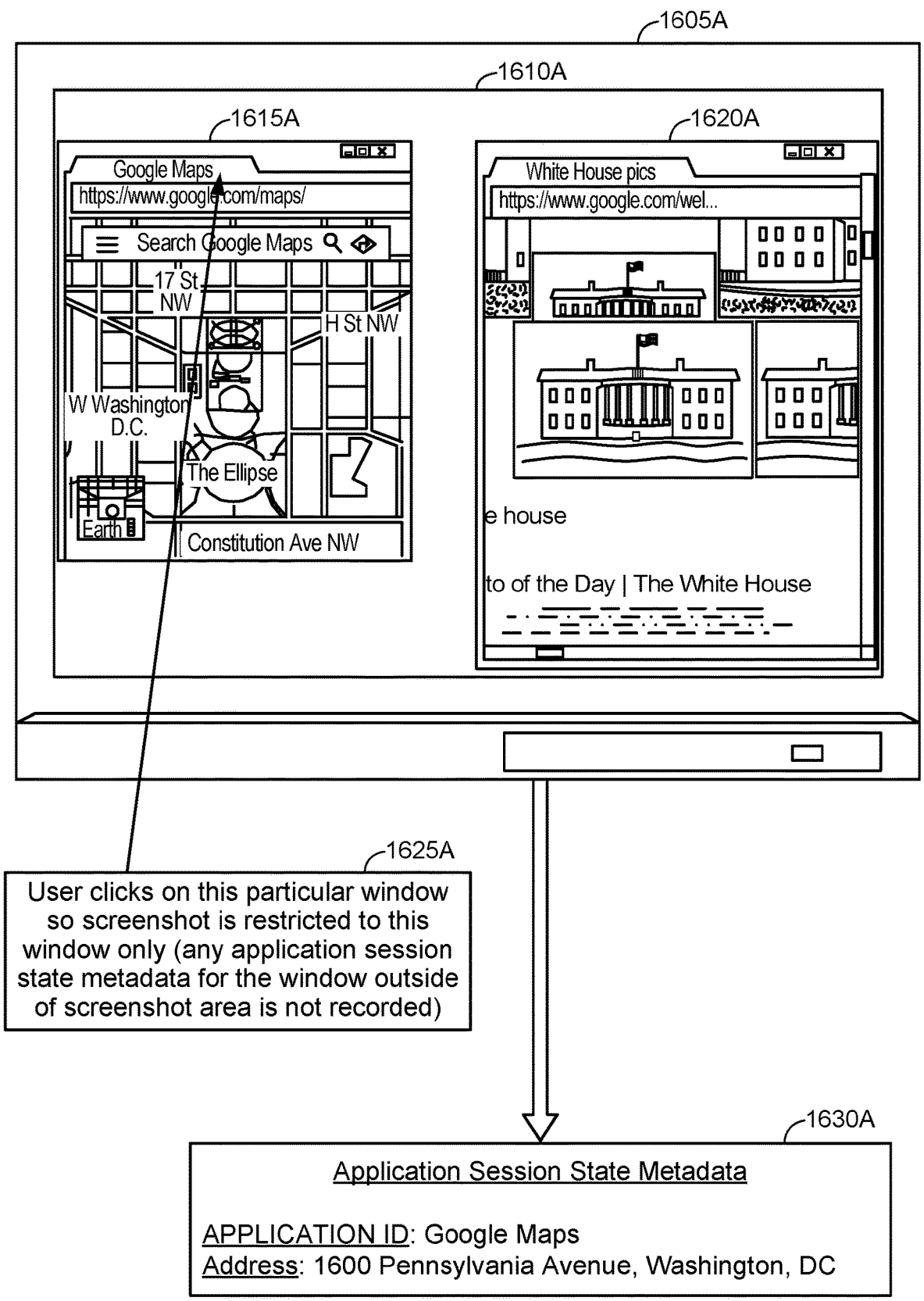
FIG. 16A illustrates an application-specific metadata generation for a screenshot+ in accordance with an embodiment of the disclosure.

FIG. 16A illustrates an application-specific metadata generation for a screenshot+ in accordance with an embodiment of the disclosure. Similar to FIG. 15A, a computer 1605A with display screen 1610A is depicted. The display screen 1610A includes a window 1615A that depicts a Chrome web browser that is at a Google Maps URL centered around 1600, Pennsylvania Avenue, Washington, D.C., and a window 1620A that depicts a different instance of the Chrome web browser that is navigated to a Google Image Search URL for "White House". For example, the user operating the computer 1605A may be researching a trip to see the White House in Washington, D.C.

Unlike FIG. 15A, as shown in block 1625A, the user restricts a screenshot+ within the display screen 1610A to the image data contained in the window 1615A only, with any external image data (including the window 1620A) being excluded from the screenshot+. Hence, FIG. 16A demonstrates an example implementation of FIG. 9 in the sense that image data contributed by a single application (e.g., the Chrome web browser that generates the window 1615A) is captured in the screenshot+. In Windows OS-specific example, the user can initiate the window-specific screenshot by left-clicking on the window 1615A with a mouse and then pressing ALT and Printscreen keys simultaneously on a keyboard. Alternatively, in a snapshot example whereby the display screen 1610A is external to the UE that is capturing the screenshot, the user may hold the UE closer to the display screen 1610A or may zoom-in upon the window 1615A to capture the window 1615A in the screenshot+ without capturing the window 1620A.

Accordingly, window 1615A represents the image data for a screenshot+, with an example of the application-specific metadata 1635A (or application session state metadata) that characterizes the session state of the web browser in screenshot+ is as follows:

APPLICATION ID: Google Maps
Address: 1600 Pennsylvania Avenue, Washington, D.C.

Figure 16B:
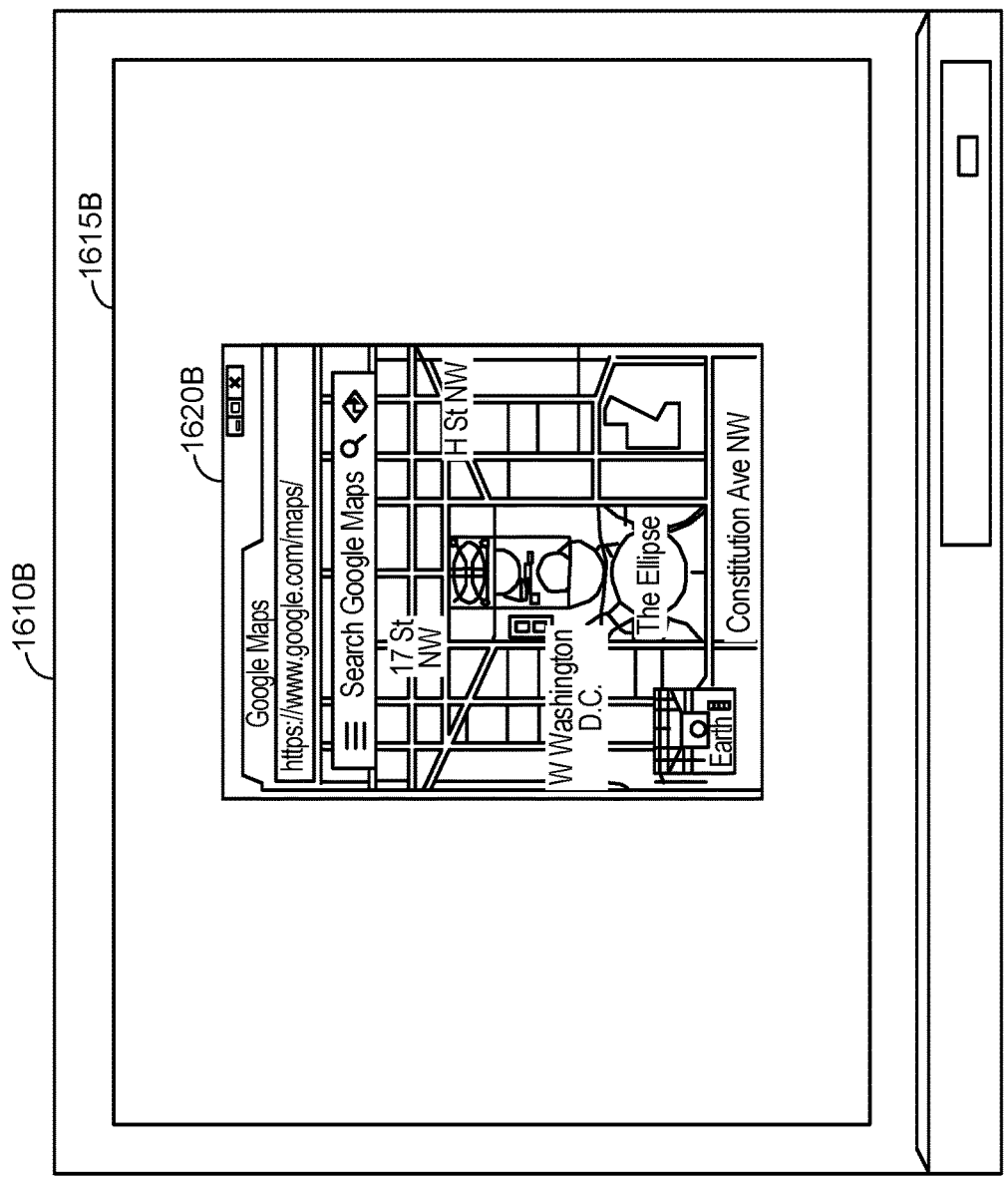
FIG. 16B illustrates an application session state recreation procedure for the screenshot+ described above with respect to FIG. 16A in accordance with an embodiment of the disclosure.
Figure 16B:
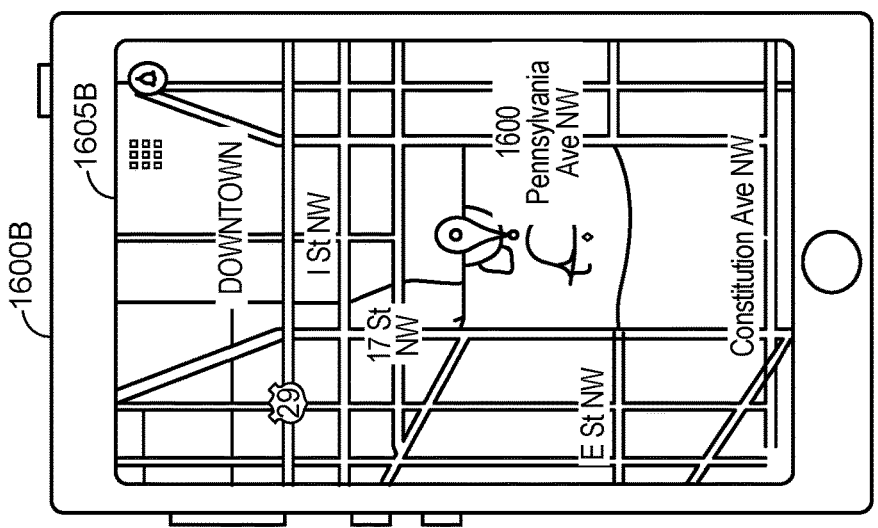

FIG. 16B illustrates an application session state recreation procedure for the screenshot+ described above with respect to FIG. 16A in accordance with an embodiment of the disclosure. Similar to FIG. 15B, a smartphone 1600B with display screen 1605A is depicted, along with a computer 1610B that includes a display screen 1615B.

Referring to FIG. 16B, the smartphone 1600B receives the application-specific metadata 1630A as described above with respect to FIG. 16A. Assume that the smartphone 1600B receives a request to load the application 1 session state (e.g., as in block 970 or block 986 of FIG. 9). Accordingly, based on the application-specific metadata 1630A, the smartphone 1600B checks whether a Google Maps application (e.g., a mobile Google Maps application because smartphone 1600B is a mobile device) is already installed on the smartphone 1600B. If not, the mobile Google Maps application is downloaded and installed. The mobile Google Maps application then processes the application-specific metadata 1630A by entering 1600 Pennsylvania Avenue, Washington, D.C. as a target address, resulting in display screen 1605B being centered around the White House. In an example, zoom information (e.g., specific geographical boundaries, a scale of zoom, etc.) at which the White House is being viewed on display screen 1605B may also be recorded as part of the application-specific metadata 1630A, such that the mobile Google Maps application at the smartphone 1600B may load the target address at a target level of zoom that is commensurate with the depiction of the target address in the window 1615A of FIG. 15A.

Referring to FIG. 16B, the computer 1610B receives the application-specific metadata 1630A as described above with respect to FIG. 16A. Assume that the computer 1610B receives a request to load the application 1 session state (e.g., as in block 970 or block 986 of FIG. 9). Accordingly, based on the application-specific metadata 1630A, the computer 1610B checks whether a Google Maps-compatible application is already installed on the computer 1610B for recreation of the application 1 session state. In this case, assume that the computer 1610B determines a default web browser navigating to the Google Maps website qualifies as a suitable Google Maps application for recreation of the application 1 session state. Accordingly, the default web browser (e.g., depicted as a Chrome browser) processes the application-specific metadata 1630A to recreate the application 1 session state in window 1620B The examples of application-specific metadata that can be obtained in association with a screenshot capture and used to recreate some or all of the characteristics of an application session state are described above with respect to FIGS. 10-13 and 15A-16B, these examples are intended for illustrative purposes only and are not intended to be limiting. Some additional examples of application-specific metadata that can be used to recreate an application session state are as follows:

TABLE 1

Application Session State Recreation Examples Based on Application-Specific Metadata

| | Session State Description for Source App. When Screenshot+ is Captured | App. Session State Metadata in Screenshot+ | Resultant Session State at UE that Recreates the Source Application Session State |
|---|---|---|---|
| 1 | A real-time video call between Source user and Target user | Application ID: Any communication application (e.g., for text, phone call, video call, etc.) User Info: Contact Information and/or User Identities for Source and Target user | The exact parameters of the real-time video call cannot be recreated. Instead, by clicking on the screenshot+ of the video call, a communication application is loaded and used to initiate a communication session (e.g., text, phone call, video call, etc.) with the Source user, the Target user, or both, so that some type of communication session with the relevant users is recreated. |
| 2 | A real-time video call between Source user and Target user | Application ID: Any communication application (e.g., for text, phone call, video call, etc.) User Info: Facial identification information for any face identifiable in the video call (e.g., face of the Source user, Target user, a friend of Source/Target user who is being captured in the video call, or any combination thereof). The facial identification information can be extracted from image data in the video call, or alternatively can be preconfigured at the Source or Target devices (e.g., Source user has default facial identification information that is used to populate the User Info for the application-specific metadata, etc.) | The exact parameters of the real-time video call cannot be recreated. Instead, by clicking on the screenshot+ of the video call, a communication application is loaded and used to initiate a communication session (e.g., text, phone call, video call, etc.) with one or more contacts matching the Facial identification information, so that some type of communication session with the relevant users is recreated. |
| 3 | A web-browser displays part of a Wikipedia web page | Application ID: Generic Online Search URI: Character String of some or all of the textual content displayed on the Wikipedia web page | A default online search engine (e.g., Google) is loaded via a web browser, and used to search for the character string. |
| 4 | A mapping application displays a portion of the map zoomed out from original result and scrolled from original center point | Applicaion ID: Original mapping application or alternatively device's default mapping application URI: Location search result based on address, a degree or zoom or zoom % from original, geographic coordinates (e.g., latitude and longitude readings) from two or more set points on the displayed portion of the map | A default mapping application (e.g. Google Maps) is launched and search can occur based on originally entered address or lat/long points. Information on zooming percentage from the original search and/or latitude and longitude information can be used to determine the center point and the amount of zoom to be used in recreating the map. Image comparisons could also be used to match the image in the screenshot to the imagery from the mapping application to find the exact location and zoom level. |
| 5 | Screenshot from the lyrics screen of a song playing on a music player | Application ID: Original music application, default music player, cloud based music service, or music store. URI: Lyrics screen; | The UE music library is searched for the matching track. If found, the song is launched in the originating music player if available. If not available, then the UE's |

TABLE 1-continued

Application Session State Recreation Examples Based on Application-Specific Metadata

| | Session State Description for Source App. When Screenshot+ is Captured | App. Session State Metadata in Screenshot+ | Resultant Session State at UE that Recreates the Source Application Session State |
|---|---|---|---|
| | | Artist, album, track information; character string from displayed lyrics to find specific point in song or lyrics display; and/or track time that capture was taken. | default music player is launched to the lyrics screen for that song at the point in the song the capture was made. If the song is not found on device, a default online music service (e.g. Spotify) is launched and searched for the song. Alternatively a music store (e.g. Apple Music or Play Music) can be launched to that song for purchase. |
| 6 | Online purchase confirmation | Application ID: Dedicated Shopping application or default web browser. URI: Order confirmation page; Order ID; Product ID; Product name; and/or Product URL; Image URL; Image file name; Image alt text; Page text. | The shopping application or default web browser is opened to one of the following views. If the page is opened from the originating UE, then the site opens to the Order Confirmation page for that customer. If it is opened from a customer service representative from the company the product was purchased from, then the Customer Service view of the order confirmation will be opened. If it is opened from any other UE, then the standard product information page for the item will be opened. |
| 7 | Chat conversation | Application ID: Chat application (e.g. WhatsApp or WeChat) URI: Chat application; Chat group identifier or contact identifier; UE owners contact information for identified contact(s); text delivered by the chat application for chat session; text derived from copy function of OS; and/or text derived from optical character recognition technology from screenshot. | The chat application would be launched and the user would be brought into the chat conversation if they were a member of the original conversation even if they were not the one who captured the screenshot. If the application provides specific information on the location in the chat that the screenshot was captured from, the user will be brought to that part of the chat (if possible). If not, then using the application's search capabilities, the system will look for text matching the text captured in the metadata from one of the methods specified. Alternatively, the user may be prompted to enter information that helps to hone-in on a relevant portion of the chat history, such as a target date-range. |
| 8 | Chat conversation | Application ID: Chat application (e.g. WhatsApp or WeChat) URI: Chat application; group or contact; UE owners contact information; text delivered by application; text derived from copy function of OS; text derived from optical character recognition technology from screenshot. | Version of chat application on device cannot understand or process any of the metadata. However, the device can at least recognize the application ID and load the chat application so that the user can attempt to manually recreate the application session state depicted in the screenshot+. In this case, the mere loading of the chat application based on the application ID constitutes recreation of an application |

TABLE 1-continued

Application Session State Recreation Examples Based on Application-Specific Metadata

| | Session State Description for Source App. When Screenshot+ is Captured | App. Session State Metadata in Screenshot+ | Resultant Session State at UE that Recreates the Source Application Session State |
|---|---|---|---|
| 9 | A Microsoft Word document | Application ID: Microsoft Word (if possible), or default word processing application URI: Name of Microsoft Word document; Location of Microsoft Word document (e.g., folder location, Internet location, etc.); File size of Microsoft Word document; Text from the Microsoft Word document (e.g., obtained from Microsoft Word or via an OCR function of the image data from the screenshot+); and/or Version Table that specifies different session state recreation instructions for different versions of Microsoft Word and/or for different Word Processing applications | session state characteristic. Load word processing application, and compare to version table. The application session state metadata is processed based on the instructions specified for the loaded word processing application as specified in the version table. For example, these instructions may specify to identify word document (if possible) and load. If word document cannot be identified, populate a new word document with text specified in the application session state metadata. |
| 10 | A music application (e.g., Pandora, Spotify, etc.) is playing a song for a themed music station | Application ID: Pandora (if possible), or default music playing application (e.g., if no Pandora subscription, etc.) URI: Seed information to generate themed music station (e.g., seed song, seed artist, seed music genre, etc.); or Song information for song that is playing in the screenshot+ | Load Pandora (e.g., via standalone application if possible, and otherwise via web browser). If Pandora is loaded, generate themed music station using seed information. If Pandora cannot be loaded, load alternate music playing application (e.g., Spotify, etc.) and attempt to use seed information to generate music station. If not possible, then simply play the song based on the song information. |
| 11 | Video Game X is being played in Full-Screen mode (Player avatar has power sword and is talking to Princess). | Application ID: Video Game X URI: A version table that includes instructions to be presented to the user to recreate game session state. An example is as follows: For version 1 of Video Game X: "Go to Elf Castle 1 and talk to King. King will give you power sword. Once you have sword, go talk to Princess." For version 2 of Video Game X: "Go to Elf Castle 2 and talk to King. King will send you on Quest 1 to obtain power sword. Complete Quest 1 to obtain sword. Once you have power sword, return to Elf Castle 2 and talk to Princess." | Load Video Game X and display the version-specific game instructions as a text prompt to the user so the user knows what to do to recreate the captured game session state. |

While Table 1 depicts various combinations of data in the application session state metadata column, it will be appreciated that each data element may be deployed in any combination (together or separately). For example, the URI in Example #6 of Table 1 lists various product-related URI parameters. These same URI parameters can be used in other contexts to locate a product (or other type of webpage) that has a URL which has been changed by searching either generically through a web browser (e.g., Google search, etc.), or running a site-specific search (e.g., Amazon.com, etc.). For example, if a product is shown in the video call in Examples #1 or #2 of Table 6, product-related URI parameters associated with that product may be added to the application-specific metadata. In another example, if a product is associated with song lyrics in Example #5 of Table 1 (e.g., Jimmy Buffet's "Margaritaville" is associated with various tropical alcoholic beverages), product-related URI parameters associated with that product may be added to the application-specific metadata, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   detecting a request from a user to capture a screenshot of image data being output on a display screen;
   in response to the request from the user, obtaining application-specific metadata that is configured to facilitate recreation of one or more characteristics of a session state of an application that is contributing at least a portion of the image data being output on the display screen when the request from the user is detected;
   selectively capturing the screenshot of the image data being output on the display screen in response to the request from the user, wherein the captured screenshot is a full-screen screenshot that includes all of the image data being output on the display screen, or wherein the captured screenshot is a partial-screen screenshot that includes less than all of the image data being output on the display screen; and
   storing the obtained application-specific metadata, wherein the storing further stores the captured screenshot in association with the obtained application-specific metadata,
   wherein the application-specific metadata includes a version table that is configured to provide different sets of instructions for recreating the one or more characteristics of the session state of the application based on a version of a target application that is attempting to recreate the one or more characteristics of the session state of the application.

2. The method of claim 1, wherein the obtaining obtains the application-specific metadata from:
   (i) the application,
   (ii) an operating system of the UE,
   (iii) the image data being output on the display screen,
   (iv) an external device, or
   (v) any combination thereof.

3. The method of claim 1,
   wherein the display screen is part of the UE, or
   wherein the display screen is part of another UE, with the selectively capturing captures the screenshot as a snapshot of the display screen of the another UE that is captured by a camera of the UE.

4. The method of claim 1, further comprising:
updating, after the storing, the application-specific metadata and/or the captured screenshot that is captured in response to the request.

5. The method of claim 4, wherein the updating includes:
removing some of the application-specific metadata associated with a cropped portion of the captured screenshot, or
adding new application-specific metadata in response to supplemental information provided by a user, or
deleting the captured screenshot while maintaining the stored application-specific data, or
adding new application-specific metadata associated with one or more informational objects identified in the image data.

6. The method of claim 1, wherein the application is one of a plurality of applications contributing some portion of the image data being output on the display screen.

7. The method of claim 6, further comprising:
obtaining additional application-specific metadata that defines at least one additional session state of at least one additional application that is contributing at least one other portion of the image data being output on the display screen when the request is detected,
wherein the storing stores both the obtained application-specific metadata for the application and the obtained application-specific metadata for the at least one additional application.

8. The method of claim 6,
wherein at least one additional application is contributing at least one other portion of the image data being output on the display screen in a section that is outside of a target screenshot area, and
wherein application-specific metadata for the at least one additional application is not stored.

9. The method of claim 6,
wherein at least one additional application is contributing at least one other portion of the image data being output on the display screen in a section that is inside of a target screenshot area,
wherein the at least one additional application does not permit sharing of application-specific metadata, and
wherein application-specific metadata for the at least one additional application is not stored.

10. The method of claim 1, wherein the application-specific metadata includes a Uniform Resource Locator (URL) in combination with secondary information indicating a manner in which the URL should be processed.

11. The method of claim 10, wherein the secondary information includes:
a time point at which to begin playback of a video associated with the URL,
one or more application identifiers of one or more applications for loading the URL,
one or more object of focus within a web site associated with the URL, or
any combination thereof.

12. The method of claim 1,
wherein the application is a map application, and
wherein the application-specific metadata includes an address, geographic coordinates, location-specific point-of-interest (POI) information, a degree of zoom, or any combination thereof.

13. The method of claim 1,
wherein the application is a chat application, and
wherein the application-specific metadata includes:
a deep-link Uniform Resource Identifier (URI) that identifies a particular section of a chat session,
identification of the chat application,
a chat group identifier or contact identifier,
contact information stored on the UE for the contact associated with the content identifier,
text exchanged during a chat session by the chat application,
text derived from a copy function of an operating system (OS) of the UE,
text derived from optical character recognition (OCR) within the image data output on the display screen, or
any combination thereof.

14. The method of claim 1,
wherein the application is a video call application, and
wherein the application-specific metadata includes:
identifying information of one or more participants in a video call,
one or more application identifiers,
facial identification information of one or more faces associated with the video call, or
any combination thereof.

15. The method of claim 1,
wherein the application is a music application, and
wherein the application-specific metadata includes:
lyrics, artist, album and/or track information,
a track time that indicates a current time point of playback of a song, or
any combination thereof.

16. The method of claim 1,
wherein the application is a shopping application, and
wherein the application-specific metadata includes:
an order confirmation page,
an order identifier,
a product identifier,
a product name,
a product Uniform Resource Locator (URL),
an image URL,
image alt text, or
any combination thereof.

17. A method of operating a user equipment (UE), comprising:
obtaining application-specific metadata that defines a session state of a first application that contributed image data within a display frame when a screenshot capture request from a user was issued,
obtaining a captured screenshot that was captured at a given UE in response to the screenshot capture request, wherein the captured screenshot is a full-screen screenshot or a partial-screen screenshot
detecting a request to load the session state of the first application defined by the application-specific metadata; and
processing, by a second application in response to the request, the application-specific metadata to recreate one or more characteristics of the session state defined by the application-specific metadata,
wherein the application-specific metadata includes a version table that is configured to provide version-specific instructions for recreating the one or more characteristics of the session state of the first application based on a version of the second application.

18. The method of claim 17, further comprising:
detecting an application requirement specified in the application-specific metadata; and
in response to the application requirement, installing a new application or updating an existing application at the UE to obtain the second application.

19. The method of claim 17, wherein the application-specific metadata further defines at least one additional session state of at least one additional application that contributed image data within the display frame when the screenshot capture request was issued.

20. The method of claim 17, further comprising:
wherein the UE is different from the given UE that captured the captured screenshot, or
wherein the UE corresponds to the given UE that captured the captured screenshot.

21. The method of claim 17, further comprising:
updating, after the obtaining, the application-specific metadata and/or the captured screenshot that is received in association with the application-specific metadata captured.

22. The method of claim 17, wherein the application-specific metadata includes a Uniform Resource Locator (URL) in combination with secondary information indicating a manner in which the URL should be processed by the second application.

23. The method of claim 22, wherein the secondary information includes:
a time point at which to begin playback of a video associated with the URL,
one or more application identifiers of one or more applications for loading the URL,
one or more object of focus within a web site associated with the URL, or
any combination thereof.

24. A user equipment (UE), comprising:
at least one processor configured to:
detect a request from a user to capture a screenshot of image data being output on a display screen;
in response to the request from the user, obtain application-specific metadata that is configured to facilitate recreation of one or more characteristics of a session state of an application that is contributing at least a portion of the image data being output on the display screen when the request from the user is detected;
selectively capture the screenshot of the image data being output on the display screen in response to the request from the user, wherein the captured screenshot is a full-screen screenshot that includes all of the image data being output on the display screen, or wherein the captured screenshot is a partial-screen screenshot that includes less than all of the image data being output on the display screen; and
store the obtained application-specific metadata,
wherein the application-specific metadata includes a version table that is configured to provide different sets of instructions for recreating the one or more characteristics of the session state of the application based on a version of a target application that is attempting to recreate the one or more characteristics of the session state of the application.

25. A user equipment (UE), comprising:
at least one processor configured to:
obtain application-specific metadata that defines a session state of a first application that contributed image data within a display frame when a screenshot capture request from a user was issued;
obtain a captured screenshot that was captured at a given UE in response to the screenshot capture request, wherein the captured screenshot is a full-screen screenshot or a partial-screen screenshot:
detect a request to load the session state of the first application defined by the application-specific metadata; and
process, by a second application in response to the request, the application-specific metadata to recreate one or more characteristics of the session state defined by the application-specific metadata,
wherein the application-specific metadata includes a version table that is configured to provide version-specific instructions for recreating the one or more characteristics of the session state of the first application based on a version of the second application.

* * * * *